US010537784B2

(12) United States Patent
Hansen

(10) Patent No.: US 10,537,784 B2
(45) Date of Patent: *Jan. 21, 2020

(54) INTEGRATED TIMING SYSTEM AND METHOD HAVING A HIGHLY PORTABLE RFID TAG READER WITH GPS LOCATION DETERMINATION

(71) Applicant: Innovative Timing Systems, LLC, St. Louis, MO (US)

(72) Inventor: Kurt S. Hansen, Chesterfield, MO (US)

(73) Assignee: Innovative Timing Systems, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,634

(22) Filed: Jul. 20, 2018

(65) Prior Publication Data
US 2018/0326287 A1 Nov. 15, 2018

Related U.S. Application Data

(63) Continuation of application No. 15/351,132, filed on Nov. 14, 2016, now Pat. No. 10,029,163, which is a (Continued)

(51) Int. Cl.
*G06K 7/10* (2006.01)
*A63B 71/06* (2006.01)
(Continued)

(52) U.S. Cl.
CPC ...... *A63B 71/0686* (2013.01); *A63B 24/0062* (2013.01); *A63B 71/0605* (2013.01);
(Continued)

(58) Field of Classification Search
CPC ............ A63B 2225/50; A63B 2225/54; A63B 2220/00; A63B 2220/14; A63B 2220/836;
(Continued)

(56) References Cited

U.S. PATENT DOCUMENTS 4,142,680 A 3/1979 Oswald et al.
4,505,595 A 3/1985 Rose et al.
(Continued)

FOREIGN PATENT DOCUMENTS

DE 102005026559 A1 12/2006
EP 1548674 A1 6/2005
(Continued)

OTHER PUBLICATIONS

Integration of RFID and Cellular Technologies, UCLA, WINMEC 2004; Karali, Sep. 2004.
(Continued)

*Primary Examiner* — Andrew W Bee
(74) *Attorney, Agent, or Firm* — Stinson LLP

(57) ABSTRACT

A system and method for determining a time of an event participant passing a detection point having a participant identifier number by a timing system coupled to an RFID tag reader in proximity to at a monitored point and receiving RFID tag read times and coupled to a portable device with a transceiver and a location detector for selectively receiving a participant number read, the timing system receiving the geographic location of the handheld device, the handheld read participant number and a handheld time, determining that the received RFID tag read times timing system are not usable times and determining a time of passing of the participant by the detection point by determining a delta time between the proximity detector and the handheld device and an adjusted time of participant passing based on the determined delta time and handheld time.

20 Claims, 13 Drawing Sheets

Related U.S. Application Data continuation of application No. 14/374,753, filed as application No. PCT/US2013/023274 on Jan. 25, 2013, now Pat. No. 9,495,568.

(60) Provisional application No. 61/590,667, filed on Jan. 25, 2012.

(51) Int. Cl.
   *G07C 1/24* (2006.01)
   *A63B 24/00* (2006.01)
   *G01S 19/19* (2010.01)

(52) U.S. Cl.
   CPC ...... *A63B 71/0616* (2013.01); *G06K 7/10128* (2013.01); *G06K 7/10198* (2013.01); *G06K 7/10366* (2013.01); *G07C 1/24* (2013.01); *A63B 2220/12* (2013.01); *A63B 2220/62* (2013.01); *A63B 2225/54* (2013.01); *G01S 19/19* (2013.01)

(58) Field of Classification Search
   CPC . A63B 71/06; A63B 71/0686; A63B 24/0062; A43B 3/0005; G01S 19/19; G07C 1/00; G07C 1/22; G07C 1/24
   See application file for complete search history.

(56) References Cited

U.S. PATENT DOCUMENTS

| | | | |
|---|---|---|---|
| 4,812,845 A | 3/1989 | Yamada et al. |
| 4,918,630 A | 4/1990 | Plouff et al. |
| 5,091,895 A | 2/1992 | Chatwin et al. |
| 5,140,307 A | 8/1992 | Rebetez et al. |
| 5,436,611 A | 7/1995 | Arlinghaus, Jr. |
| 5,493,805 A | 2/1996 | Penuela et al. |
| 5,511,045 A | 4/1996 | Sasaki et al. |
| 5,604,485 A | 2/1997 | Lauro et al. |
| 5,696,481 A | 12/1997 | Pejas et al. |
| 5,812,049 A | 9/1998 | Uzi |
| 5,821,902 A | 10/1998 | Keen |
| 5,883,582 A | 3/1999 | Bowers et al. |
| 5,973,598 A | 10/1999 | Beigel |
| 6,008,773 A | 12/1999 | Matsuoka et al. |
| 6,100,804 A | 8/2000 | Brady et al. |
| 6,204,813 B1 | 3/2001 | Wadell et al. |
| 6,278,413 B1 | 8/2001 | Hugh et al. |
| 6,340,932 B1 | 1/2002 | Rodgers et al. |
| 6,369,697 B1 | 4/2002 | Poole |
| 6,466,178 B1 | 10/2002 | Muterspaugh |
| 6,496,806 B1 | 12/2002 | Horwitz et al. |
| 6,512,478 B1 | 1/2003 | Chien |
| 6,570,487 B1 | 5/2003 | Steeves |
| 6,577,238 B1 | 6/2003 | Whitesmith et al. |
| 6,696,954 B2 | 2/2004 | Chung |
| 6,703,935 B1 | 3/2004 | Chung et al. |
| 6,710,713 B1 | 3/2004 | Russo |
| 6,720,930 B2 | 4/2004 | Johnson et al. |
| 6,812,824 B1 | 11/2004 | Goldinger et al. |
| 6,839,027 B2 | 1/2005 | Krumm et al. |
| 6,888,459 B2 | 5/2005 | Stilp |
| 6,888,502 B2 | 5/2005 | Beigel et al. |
| 6,952,157 B1 | 10/2005 | Stewart et al. |
| 6,963,270 B1 | 11/2005 | Gallagher, III et al. |
| 6,989,750 B2 | 1/2006 | Shanks et al. |
| 6,995,655 B2 | 2/2006 | Ertin et al. |
| 7,009,562 B2 | 3/2006 | Jenabi |
| 7,019,639 B2 | 3/2006 | Stilp |
| 7,057,511 B2 | 6/2006 | Shanks et al. |
| 7,057,975 B2 | 6/2006 | Stobbe |
| 7,339,478 B2 | 3/2008 | Le |
| 7,508,739 B2 | 3/2009 | Paes |
| 7,589,616 B2 | 9/2009 | Klatsmanyi et al. |
| 7,605,685 B2 | 10/2009 | Stewart et al. |
| 7,605,689 B2 | 10/2009 | Hein et al. |
| 8,085,136 B2 | 12/2011 | Stewart et al. |
| 8,179,233 B2 | 5/2012 | Kia |
| 8,332,281 B2 | 12/2012 | Smith et al. |
| 8,442,922 B2 | 5/2013 | Martin |
| 2001/0030625 A1 | 10/2001 | Doles et al. |
| 2001/0040895 A1 | 11/2001 | Templin |
| 2002/0008622 A1 | 1/2002 | Weston et al. |
| 2002/0008624 A1 | 1/2002 | Paek |
| 2002/0044057 A1 | 4/2002 | Zirbes |
| 2002/0044096 A1 | 4/2002 | Chung |
| 2003/0014678 A1 | 1/2003 | Ozcetin et al. |
| 2003/0073518 A1 | 4/2003 | Marty et al. |
| 2003/0163287 A1 | 8/2003 | Vock et al. |
| 2003/0189484 A1 | 10/2003 | Rust et al. |
| 2004/0006445 A1 | 1/2004 | Paek |
| 2005/0093976 A1 | 5/2005 | Valleriano et al. |
| 2005/0099269 A1 | 5/2005 | Diorio et al. |
| 2005/0138798 A1 | 6/2005 | Sakama et al. |
| 2006/0097847 A1 | 5/2006 | Bervoets et al. |
| 2006/0097874 A1 | 5/2006 | Salesky et al. |
| 2006/0103536 A1 | 5/2006 | Kwak et al. |
| 2006/0176216 A1 | 8/2006 | Hipskind |
| 2007/0076528 A1 | 4/2007 | Kirby |
| 2007/0097969 A1 | 5/2007 | Regnier |
| 2007/0182567 A1 | 8/2007 | Stewart et al. |
| 2007/0252770 A1 | 11/2007 | Kai et al. |
| 2007/0262871 A1 | 11/2007 | Yamagajo et al. |
| 2007/0272011 A1 | 11/2007 | Chapa, Jr. et al. |
| 2008/0015819 A1 | 1/2008 | Sayre et al. |
| 2008/0018479 A1 | 1/2008 | Hashimoto et al. |
| 2008/0021676 A1 | 1/2008 | Vock et al. |
| 2008/0111695 A1 | 5/2008 | Yamagajo et al. |
| 2008/0139263 A1 | 6/2008 | He et al. |
| 2008/0143620 A1 | 6/2008 | Khatri |
| 2008/0246615 A1 | 10/2008 | Duron et al. |
| 2008/0246616 A1 | 10/2008 | Sakama et al. |
| 2008/0284654 A1 | 11/2008 | Burnside et al. |
| 2008/0316032 A1 | 12/2008 | Kia |
| 2009/0015377 A1 | 1/2009 | Fogg et al. |
| 2009/0141138 A1 | 6/2009 | DeAngelis |
| 2009/0184806 A1 | 7/2009 | Kia |
| 2009/0231198 A1 | 9/2009 | Walsh et al. |
| 2009/0284368 A1 | 11/2009 | Case, Jr. |
| 2009/0284375 A1 | 11/2009 | Kuo et al. |
| 2010/0019897 A1 | 1/2010 | Stewart et al. |
| 2010/0051701 A1 | 3/2010 | Ogata et al. |
| 2010/0088023 A1 | 4/2010 | Werner |
| 2010/0271263 A1 | 10/2010 | Moshfeghi |
| 2010/0295943 A1 | 11/2010 | Cha et al. |
| 2010/0302910 A1 | 12/2010 | Howell |
| 2010/0308965 A1 | 12/2010 | Weitzhandler et al. |
| 2011/0018689 A1 | 1/2011 | McAllister et al. |
| 2011/0054792 A1 | 3/2011 | McClellan |
| 2011/0055045 A1 | 3/2011 | Smith et al. |
| 2011/0141221 A1 | 6/2011 | Satterlee et al. |
| 2011/0227748 A1 | 9/2011 | Schaible et al. |
| 2011/0251972 A1 | 10/2011 | Martin |
| 2011/0298583 A1 | 12/2011 | Libby et al. |
| 2012/0082007 A1 | 4/2012 | Duxbury |
| 2012/0115557 A1 | 5/2012 | Kia |
| 2012/0230240 A1 | 9/2012 | Nebat et al. |
| 2014/0052279 A1 | 2/2014 | Van Rens |

FOREIGN PATENT DOCUMENTS

| | | |
|---|---|---|
| EP | 2009595 A | 12/2008 |
| JP | 2000271259 A | 10/2000 |
| JP | 2002281492 A | 9/2002 |
| JP | 2003-327331 A | 11/2003 |
| JP | 2006-004065 A | 1/2006 |
| JP | 2006-053655 A | 2/2006 |
| JP | 2006280670 A | 10/2006 |
| JP | 2008-276353 A | 11/2006 |
| JP | 2007228195 A | 9/2007 |
| JP | 2008-299535 A | 12/2008 |
| JP | 4394600 A | 10/2009 |
| JP | 2010-088886 A | 4/2010 |
| JP | 2010-202998 A | 9/2010 |
| JP | 2011-002958 A | 1/2011 |

(56) References Cited

FOREIGN PATENT DOCUMENTS

| KR | 10-2002-0008234 A | 1/2002 |
|---|---|---|
| KR | 10-2002-0065429 A | 8/2002 |
| KR | 10-0438359 B1 | 7/2004 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |
| KR | 10-2010-0119271 A | 11/2010 |
| WO | 2010138882 A1 | 12/2010 |
| WO | 2011109419 A2 | 9/2011 |

OTHER PUBLICATIONS

Mobile RFID Reader with Database Wireless Synchronization, S. Sandoval-Reyes, et al, 2nd ICEEE and CIE2005, Mexico City, Sep. 7-9, 2005.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2013/023274 (INTI E015WO), dated May 15, 2013.
European Search Report, EP 13741413.2 (INTI E015EP),dated Feb. 5, 2015.

MESSAGE TYPE | SOURCE | CUSTOM 1 | CUSTOM 2 | CUSTOM N | EOM |

DEFINITIONS FOR EACH FIELD IN THE INFORMATION PACKET STRUCTURE

MESSAGE TYPE  — INDICATOR FOR THE TYPE OF MESSAGE BEING SENT
SOURCE        — THE NAME OR ID OF THE TRANSMITTING SYSTEM
CUSTOM 1...N  — VARIABLE LENGTH FIELD CONTAINING USER-DEFINED DATA
EOM           — INDICATOR PLACED AT THE END OF THE INFORMATION PACKET
|             — SEPARATOR USED BETWEEN EACH FIELD OF INFORMATION WITHIN
                THE PACKET, AS WELL AS AT THE END OF AN
                INFORMATION PACKET

FIG. 8

(A) —READ|FROM|TAGSERIALNUMBER|TIME|PACKET#|EOM|
(B) —READ|FROM|PARTICIPANTNAME|TIME|PACKET#|EOM|
(C) —RESEND|FROM|DESTINATION|PACKET#|EOM|
(D) —TSYNC|FROM|TIME|EOM|
(E) —LOOKUP|FROM|IDENTIFIER|PACKET#|EOM|
(F) —COMMAND|FROM|DEST|IDENTIFIER|PACKET#|EOM|
(G) —RSIG|FROM|TIME|EOM|
(H) —RQIMAGE|FROM|DEST|IDENTIFIER|COMPRESSION|PACKETSIZE|PSOCKET|PACKET#|EOM|
(I) —STIMAGE|FROM|DEST|IDENTIFIER|COMPRESSION|PACKETSIZE|PSOCKET|PACKET#|EOM|

FIG. 9

METS BACKUP READ PROCESS

STEP 1: GO TO THE FINISH LINE AND USE TOMCAT SOFTWARE TO RECORD THE LOCATION USING THE GPS DATA

STEP 2: USE TOMCAT BEHIND THE FINISH LINE TO RECORD TAG READS AS PARTICIPANTS RUN PAST

STEP 3: SEND GPS DATA AS WELL AS TAG READ OVER TO THE JAGUAR SYSTEM AT A FINISH LINE USING WI-FI

STEP 4: JAGUAR SOFTWARE ON FINISH LINE SYSTEM USES BACKUP CHIP TIME IF FINISH LINE SYSTEM MISSED READ

STEP 5: IF BACKUP READ IS USED, JAGUAR SOFTWARE WILL ADJUST THE READ TIME BASED ON DISTANCE COMPUTED FROM THE GPS DATA. FINISH LOCATION - CHIP READ FROM TOMCAT YIELDS DISTANCE

STEP 6: JAGUAR STORES THE CHIP DATA AND PLACES INDICATOR IN DATA FILE THAT READ CAME FROM TOMCAT

FIG. 13

INTEGRATED TIMING SYSTEM AND METHOD HAVING A HIGHLY PORTABLE RFID TAG READER WITH GPS LOCATION DETERMINATION

CROSS-REFERENCE TO RELATED APPLICATIONS

This application is a Continuation application of U.S. application Ser. No. 15/351,132 filed Nov. 14, 2016, which is a Continuation application of U.S. application Ser. No. 14/374,753 filed Jul. 25, 2014, which is now U.S. Pat. No. 9,495,568, which is a U.S. national phase § 371 application of PCT International Application No. PCT/US2013/023274 filed on Jan. 25, 2013, which claims the benefit of U.S. Provisional Application No. 61/590,667, filed on Jan. 25, 2012.

The disclosures of the above applications are incorporated herein by reference.

FIELD

The present disclosure relates to timing systems and, more specifically, to integrated timing system (ITS) for tracking the passing of monitored persons or objects past a monitored point.

BACKGROUND

The statements in this section merely provide background information related to the present disclosure and may not constitute prior art.

RFID tag reader systems (TRS) are used to track RFID tags often must be able to detect numerous tags crossing a detection point within a very short period of time. For example, RFID tag reader systems are often used in sporting events to time participants of such events. In such applications, that include marathon races, the RFID tag readers for the sports timing systems have a very difficult job as they are required to read hundreds, or perhaps thousands of timing participant identifiers as they cross a start, split, or finish line. The technology typically used by other systems can very susceptible to electrical interference, weather, and other factors. The RFID race timing systems operates at an ultra-high frequency and is less susceptible to interference. This helps reduce the number of problems the user might experience on race day. Many such systems use a passive participant identifier that does not require a battery. The participant identifier operates in the Ultra-High Frequency (UHF) range, which provides a more consistent and clean signal. Some of these systems often use low frequency (LF) participant identifiers that can be susceptible to interference from things like electrical power lines, rebar in concrete roads, mobile telephone systems or storms. UHF signals travel in a direction commonly referred to as line-of-sight. This simply means that the signal is highly concentrated in a single direction, and that is why it works so well for timing races.

While current RFID readers can have an overall participant identifier read success can range from 98.0% to 100% with as many as 30 participants crossing a finish line within a 1-second period, some tags cannot be read and their passing of the detection point information is never automatically recorded by the RFID readers. As such, there is a need for providing methods and systems for enabling supplemental tag reads.

The inventor hereof has identified the problems of using an RFID tag reading system for timing sporting events where there are a large number of participants, and the system experiences a failure to read 100% of the RFID tags worn by the participants. The inventor has identified the need to ensure that timing information is collected for as many participants as possible including 100 percent.

SUMMARY

The inventor hereof has succeeded at designing an improvement to an event timing system that provides for a participant identifier read by a highly portable tag reader that is geographically offset from a detection point having a fixed participant identifier detector such as an RFID tag reader. The highly portable tag reader includes a location detector for determining its geographically defined location and providing the determined location and participant identifier number such as the participant identifier number and time of read to the timing system. Improvements in the timing system provide for identifying an unusable or missing participant identifier read time, receiving the tag read and time of read from the highly portable tag reader and adjusting the time of such highly portable tag read to adjust for the difference in geographic position of the highly portable tag reader from the detection point. The timing system determines the adjusted time for the participant and saves the adjusted time as the time of passing thereby providing the timing system with the ability of having 100 percent participant times of passing.

According to one aspect, a system and method for determining a time of an event participant passing a detection point having a participant identifier number by a proximity detector at a detection point, a highly portable device with a transceiver and a location detector for selectively receiving a participant number read, and determining a location of the portable device, and a timing system having the geographic location of the proximity detector, receiving the geographic location of the handheld device, the handheld read participant number and a handheld determined time, determining that the timing system has not received a usable tag read time from the proximity detector and determining a time of passing of the participant by the detection point by determining a delta time between the proximity detector and the handheld device and an adjusted time of participant passing based on the determined delta time and handheld determined time.

In another aspect, a handheld system provides for supporting an integrated timing system that determines a time of a passing at a monitored detection point by a participant in an event having a participant identifier with an associated unique participant identifier number. The system includes a participant proximity detector, a handheld device, and a timing system. The participant proximity detector has a processor, a memory, a clock, a participant identifier detector transceiver receiving the participant identifier number from the participant identifier, identifying a tag read time of the received participant identifier read, and a data interface for transmitting the participant identifier number and the identified participant identifier read time. The handheld device has a processor, a memory, a clock, a user interface, a communication interface, a location detection device for determining a geographic location of the handheld device, and a participant identifier detector transceiver for selectively reading the participant identifier and receiving the participant identifier number from the participant identifier, determining a time of receipt of the participant identifier number by the handheld, and transmitting the determined geographic location of the handheld device, the handheld read tag number and the handheld determined time over the communication interface. The timing system has a processor, a communication interface, and a memory storing a location for the participant proximity detector. The timing system receives the geographic location of the handheld device, receives the handheld read tag number and the handheld determined time, determines that the timing system has not received a usable tag read time from the participant proximity detector for the same participant identifier number as the handheld read tag number, determines a delta time as from the difference in the location of the GPS tag reader and the location of the handheld device, calculates an adjusted time for the participant identifier number from the handheld determined time and the calculated delta time, and stores the calculated adjusted time as a time of passing of the detection point for the participant identifier number.

According to yet another aspect, a handheld system supports an integrated timing system in the determination of a time of a passing at a monitored detection point by a participant in an event having a participant identifier with an associated unique participant identifier number. The includes a timing system having a processor for executing computer executable instructions, a memory having a computer readable medium for storing the computer executable instructions and storing user input data, and a communication interface for communicating. The system also includes a participant proximity detector having a processor for executing computer executable instructions, a memory having a computer readable medium for storing the computer executable instructions and storing user input data, a clock for determining a present time, a radio frequency transceiver for communicating with the RFID and receiving a tag read from the participant identifier, storing the associated participant identifier number, identifying a tag read time of the received tag read from the clock, and storing the participant identifier number and the associated tag read time in the participant proximity detector memory, and a data interface for communicating with the timing system including transmitting the participant identifier number and the associated tag read time. A handheld device has a processor, a memory, a clock, a user interface, computer executed instructions, a wireless communication interface, a location detection device for determining a geographic location of the handheld device, and a participant identifier detector transceiver for selectively reading a participant identifier and obtaining the participant identifier number associated with the participant identifier being selectively read, the handheld device determining from the clock a time associated with the receipt of the received participant identifier number, storing the handheld read tag number and the handheld determined time in the handheld memory; and transmitting the determined geographic location of the handheld device, the handheld read tag number and the handheld determined time over the wireless communication interface. The timing system has or receives a location for the participant proximity detector stored in its memory, receives the geographic location of the handheld device, receives the handheld read tag number and the handheld determined time, determines that the timing system has not received a usable tag read time for the same participant identifier number from the participant proximity detector, determining a delta time based on the difference in the location of the GPS tag reader and the location of the handheld device, calculates an adjusted time for the participant identifier number as a function of the handheld determined time and the calculated delta time, and stores in the timing system memory the adjusted time as a time of passing of the detection point for the participant identifier number.

According to still another aspect, a method provides for determining a time of a passing a monitored detection point by a participant in an event having a participant identifier with an associated unique participant identifier number. The method including various steps performed in various system components. a) In a participant proximity detector having a processor, a memory, a clock, a participant identifier detector transceiver, the steps of receiving the participant identifier number the participant identifier, identifying a tag read time of the received participant identifier read, and transmitting the participant identifier number and the identified participant identifier read time. b) In a handheld device having a processor, a memory, a clock, a user interface, a communication interface, a location detection device, the method includes the steps of determining a geographic location of the handheld device, reading the participant identifier number of the participant identifier, determining a time of receipt of the participant identifier number by the handheld, and transmitting the determined geographic location of the handheld device, the handheld read tag number and the handheld determined time. c) In a timing system having a processor, a communication interface, and a memory the method includes the steps of storing a location for the participant proximity detector, receiving the geographic location of the handheld device, the handheld read tag number and the handheld determined time from the handheld device, determining that the timing system has not received a usable tag read time from the participant proximity detector for the same participant identifier number as the handheld read tag number, determining a delta time from the difference in the location of the GPS tag reader and the location of the handheld device, calculating an adjusted time for the participant identifier number from the handheld determined time and the determined delta time, and storing the calculated adjusted time as a time of passing of the detection point for the participant identifier number.

Further aspects of the present disclosure will be in part apparent and in part pointed out below. It should be understood that various aspects of the disclosure might be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 8 is an illustration of the format for the variable length handheld METS packet messages according to one exemplary embodiment.

FIG. 9 is an illustration of the formats for an exemplary set of handheld METS messages according to one exemplary embodiment.

FIG. 13 is a process flow for use of an RFID tag read by a highly portable METS device for determining a time of passing of a participant according to one exemplary embodiment.

It should be understood that throughout the drawings, corresponding reference numerals indicate like or corresponding parts and features.

FIG. 11 is a diagram of a highly portable METS and the interfacing with remote systems according to one exemplary embodiment. This embodiment illustrates the components of the handheld device including the location detection via the GPS position device, the image capture, the bar code scanner, and a user interface that can include a keyboard. The METS system communicates with the TS/ITS and/or TRS via any suitable means.

DETAILED DESCRIPTION

Figure 1:
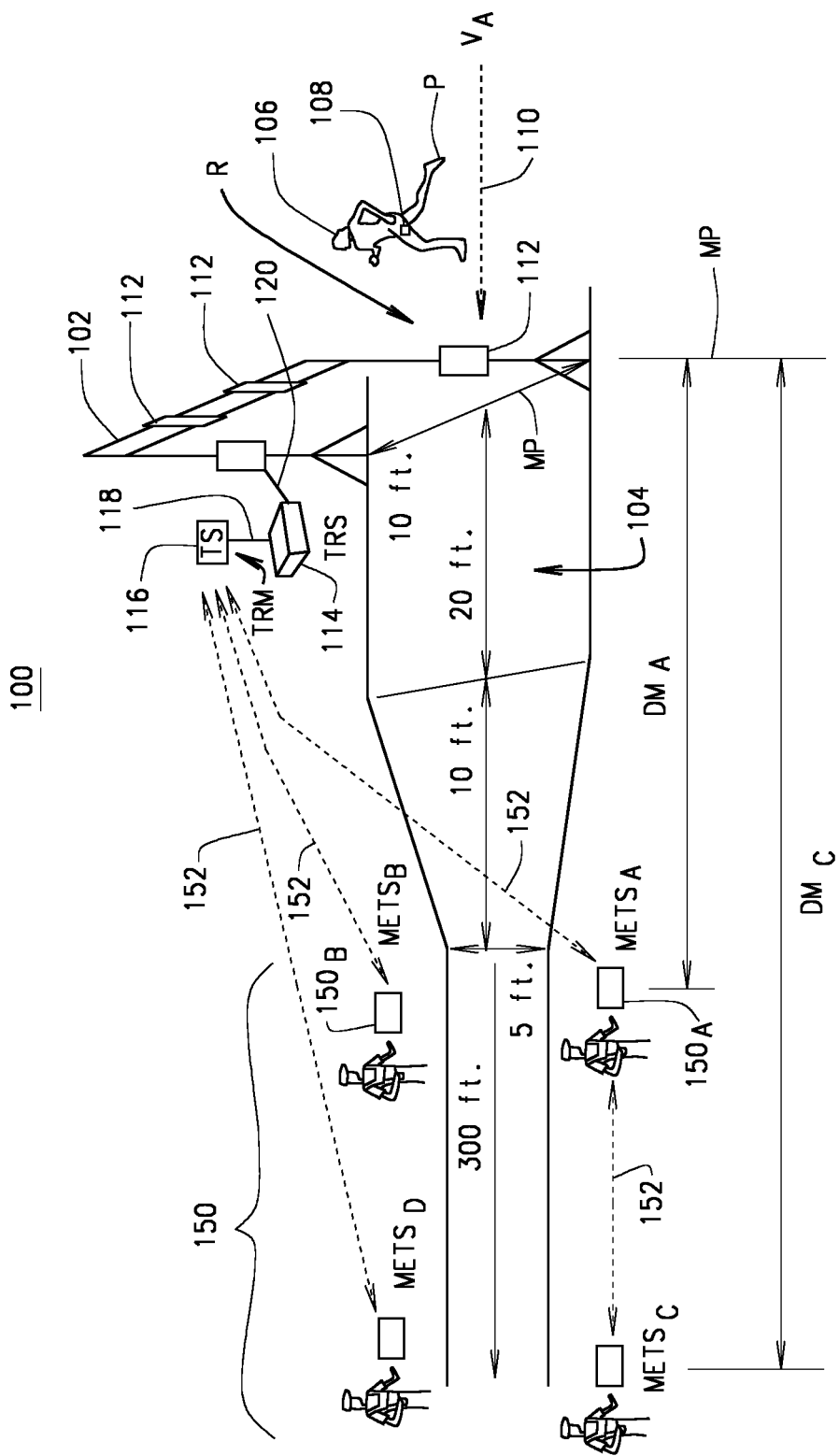
FIG. 1 is an illustration of a timing system at a monitored location with a single automated participant proximity detector shown as an RFID tag reader system TRS and four handheld remote entry METS systems each spaced apart from the monitored location according to a one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

According to an initial embodiment, this disclosure provides systems and methods for determining a time of an event participant passing a detection point having a participant identifier number by a proximity detector at a detection point, a highly portable device with a transceiver and a location detector for selectively receiving a participant number read, and determining a location of the portable device, and a timing system having the geographic location of the proximity detector, receiving the geographic location of the handheld device, the handheld read participant number and a handheld determined time, determining that the timing system has not received a usable tag read time from the proximity detector and determining a time of passing of the participant by the detection point by determining a delta time between the proximity detector and the handheld device and an adjusted time of participant passing based on the determined delta time and handheld determined time.

As described herein, a timing system TS is also referred to as an integrated timing system ITS.

As described herein, a detection point or participant proximity detection system or detections are capable of identifying a participant so as to at least partially track the location/locations of the participant using a participant identifier having a unique participant identifier number. This can be a participant tag or other participant identifier such as a bib or other means including images of the participant or their vehicle for uniquely identifying the particular participant from among a plurality of participants. Often these events are timed events, but the present disclosure includes both timed and untimed events wherein a participant in the event is tracked. It should be noted that the participant tag or other participant identifier and participant tag number can be of any type. As will be discussed herein, by way of one exemplary embodiment, the participant identifiers can be participant identifiers such as an RFID tag and the RFID detection systems and RFID participant proximity detectors can then be RFID tag readers and detection systems. However, RFID tags and tag readers are only one technology, and for the purposes of this disclosure, one skilled in the art should be aware that any types of RFID tags and readers or trackers or detection systems could be used and still be within the scope of the present invention. As such, for the remainder of the present specification and disclosure, any reference to an RFID tag or RFID technology is only exemplary, and should not be viewed as being limited to only RFID technology. Further, any reference herein to a tag reader should be understood to be any participant proximity detector that detects the presence of the participant in proximity to the detector. This could include an image or laser or GPS detection system and technology as well as the RFID technology, bar code scanning, and other related technologies, and all are considered with the scope of this disclosure. Any reference to tag reader or tag should be interpreted as only one exemplary embodiment for implementing the tracking and identification of the participant relative to a detector.

Further, as described herein, the handheld highly portable device or system can be a uniquely design specialized device or can be an adapted device including a mobile or smart phone equipped with one or more participant detectors. These can include an RFID reader, an image capture device and number or facial recognition capability, or any other type of device suitable for that disclosed herein. As a handheld unit, it can be connectable to a wired communication system when plugged in, or can be wirelessly connected via a suitable wireless communication system. The wireless embodiments can provide for more near real time communication of participant identifications and detections, as a wired system would require wiring at the highly portable location of use or would require a time delay waiting for later plugging into the wired communication system. However all are within the scope of the present disclosure.

According to some embodiments, a handheld system for supporting an integrated timing system including the determination of a time of a passing at a monitored detection point by a participant in an event having a participant identifier such as an RFID tag with an associated unique participant identifier number such as an RFID tag number. The system can include a participant identifier detector locatable at the detection point or line, a highly portable handheld device having a participant identifier detector transceiver such as a RFID transceiver and a location detection device, and a timing system. The participant identifier detector such as a participant identifier detector has a processor, a memory, a clock, a participant identifier detector transceiver receiving the participant identifier number the participant identifier, identifying a tag read time of the received participant identifier read, and a data interface for transmitting the participant identifier number and the identified participant identifier read time.

The highly portable, such as handheld device, by way of example and as generally referred herein by way of such example, includes a processor, a memory, a clock, a user interface, and a communication interface. A location detection device, such as a GPS receiver by way of example, is provided for determining a geographic location of the handheld device. The participant identifier detector transceiver selectively reads the participant identifier such as the participant identifier and receives the participant identifier number such as the participant identifier number from the participant identifier. The handheld device determines a time of receipt of the participant identifier number and transmits the determined geographic location of the handheld device, the handheld read tag number and the handheld determined time over the communication interface. The timing system has a processor, a communication interface, and a memory storing a location for the participant identifier detector.

The timing system is configured to receive the geographic location of the handheld device, receive the handheld read tag number and the handheld determined time. It can be further configured to determine that the timing system has not received a usable tag read time from the participant identifier detector for the same participant identifier number as the handheld read tag number. It is further provided for determining a delta time as from the difference in the location of the GPS tag reader and the location of the handheld device and calculating an adjusted time for the participant identifier number from the handheld determined time and the calculated delta time. The timing system then stores the calculated adjusted time as a time of passing of the detection point for the participant identifier number.

In some embodiments, the participant identifier detector TRS provides the timing system and the timing system receives one or more the tag reads for a participant identifier number with one or more identified participant identifier read times. The timing system can determine from those tag reads that it cannot accurately determine the time of passing of the participant at the detection point or that a participant identifier read is missing a final determinative read, or any read at all. The timing system can then determine, under these and similar situations that for a particular participant identifier number and therefore particular participant, that the timing system has not received a usable tag read and therefore cannot store or otherwise provide a time of passing of the participant and/or the participants participant identifier past the detection line. This process of determining an unusable participant identifier read by the participant detector system participant detector system TRS can include other situations and is still considered within the scope of this disclosure. In one exemplary embodiment of such a timing system, the timing system determines a velocity of the participant approaching the detection point from one or more participant detector system TRS based tag reads as the tag and its participant approaches the detection point. The timing system uses these earlier tag reads to calculate the delta time even though the timing system found that the participant detector system TRS tag reads did not provide a usable final time of passing for whatever reason. The timing system TS using the earlier tag read times to determine or calculate a velocity of the participant as he approaches the detection point. The velocity is then used by the timing system TS along with the location of the portable tag reader and the known location of the detection point/TRS system to determine the delta time for which the highly portable remote entry detection entry system (METS) is adjusted in order to provide the adjusted time of passing of the participant at the detection point, in lieu of the lack of a usable participant detector system TRS tag read time. As described herein METS, a METS is not limited to manual entry but includes any highly portable detection entry system for receiving a participant identification by a user and providing such to a timing system.

In another embodiment, the timing system receives from one or more participant detector system TRS located in proximity to the detection point a plurality of participant identifier reads for a plurality of participant identifier numbers each having a plurality of identified participant identifier read times. Of course each one includes a different participant identifier number associated with a different participant. The timing system determines from the plurality of participant identifier read times for the plurality of participant identifier numbers, an average velocity of two or more participant identifiers (participants) as they approach the detection point. In this embodiment, the timing system timing system TS can calculate the delta time based on the determined average velocity of a plurality of participants. This may be desirable where the density of participant identifiers approaching the detection point is high and therefore the timing system TS cannot obtain sufficient tag reads from all of the participant identifiers within the group.

As the handheld device in one embodiment is highly portable, in some embodiments it includes a wireless interface (such as a Wi-Fi or mobile network interface) and transmits over the wireless interface to a communication interface of the timing system that is compatible with such wireless communication capability. Of course in other embodiments, the handheld tag reader can be coupled to the timing system TS and/or TRS or ITS NET via any suitable communication medium.

The handheld device can be configured to receive a clock synchronization message including a system time value from the timing system so that the time stamping is in synchronization with that of the timing system TS and/or TRS. In such embodiments, the clock of the handheld is configured to set a present time of the clock to the value of the received system time value.

In some embodiments, the location detection device is user activated based on receiving an activation input via the user interface. For example, the user interface can be configured to receive a user input and initiate responsive thereto the transmission of a secondary location and an identification of the secondary location. For example, the user can use the location device capability of the handheld device to spot or locate or otherwise provide the timing system with a geographic location of any place on the route including any detection or monitored point, any detection system TRS, any route feature, or the mapping of event route in GPS data, or changes thereto, before, during or after an event. The timing system receives this secondary location data and the identifications of the secondary locations, and stores the secondary locations in the timing system memory as the location of the participant identifier detector. In this manner, the handheld device can be used to geographically locate other components or points or points of interest in a course or for an event and provide such location data to the timing system. This of course includes the location of the participant detector system TRS and/or detection point that can be used relative to the above-described use for determination of the delta time, by way of example, and as stored in the timing system TS for a detection system TRS location/position.

Similarly, the user interface of the handheld device includes a user-activated mechanism for controlling the participant identifier detector transceiver for selectively reading the participant identifier.

In some embodiments of the handheld device, there is an image capture device such as a camera for still or video image capture that can be used for selectively capturing an image in proximity to the handheld device. The handheld device can be configured for receiving an input via the user interface for initiating the capturing of an image and transmitting the captured image. In such embodiments, the timing system receives the captured image and stores the received captured image in the timing system memory.

In some embodiments, the handheld device is configured for associating the captured image with the participant identifier number as received by the participant identifier detector transceiver and transmitting the associated participant identifier number with the captured image. As such, the timing system receives the captured image and the associated participant identifier number and stores the received captured image with a file associated with the participant identifier number. In other cases the captured image can be time stamped and later associated with a participant identifier read or tag number based on the timestamp.

In other embodiments, the participant has an associated bar code such as on his person, bib, car or bicycle. In such embodiments, the handheld device can include a bar code scanning device for selectively scanning of a bar code that is in proximity to the handheld device. The handheld device is configured for receiving an input via the user interface for initiating the scanning of the bar code associated with the participant, and transmitting the scanned bar code with the captured image. The timing system receives the scanned bar code, determines the participant identifier number associated with the received bar code, and stores the scanned image in a file associated with determined participant identifier number.

In another embodiment, a handheld system for supporting an integrated timing system including the determination of a time of a passing at a monitored detection point by a participant in an event having a participant identifier with an associated unique participant identifier number includes the timing system, and participant identifier detector and a highly portable or a handheld device. The timing system has a processor for executing computer executable instructions, a memory having a computer readable medium for storing the computer executable instructions and storing user input data, and a communication interface for communicating. The participant identifier detector has a processor for executing computer executable instructions, a memory having a computer readable medium for storing the computer executable instructions and storing user input data, a clock for determining a present time, a radio frequency transceiver for communicating with the RFID and receiving a tag read from the participant identifier, storing the associated participant identifier number, identifying a tag read time of the received tag read from the clock, and storing the participant identifier number and the associated tag read time in the participant identifier detector memory, and a data interface for communicating with the timing system including transmitting the participant identifier number and the associated tag read time. The handheld device has a processor, a memory, a clock, a user interface, computer executed instructions, a wireless communication interface, a location detection device for determining a geographic location of the handheld device, and a participant identifier detector transceiver for selectively reading a participant identifier and obtaining the participant identifier number associated with the participant identifier being selectively read, the handheld device configured for determining from the clock a time associated with the receipt of the received participant identifier number, storing the handheld read tag number and the handheld determined time in the handheld memory; and transmitting the determined geographic location of the handheld device, the handheld read tag number and the handheld determined time over the wireless communication interface. The timing system has a location for the participant identifier detector stored in its memory, receives the geographic location of the handheld device, receives the handheld read tag number and the handheld determined time, determines that the timing system has not received a usable tag read time for the same participant identifier number from the participant identifier detector, determining a delta time based on the difference in the location of the GPS tag reader and the location of the handheld device, calculates an adjusted time for the participant identifier number as a function of the handheld determined time and the calculated delta time, and stores in the timing system memory the adjusted time as a time of passing of the detection point for the participant identifier number.

According to another embodiment, a method is provided for determining a time of a passing of a monitored detection point by a participant in an event having a participant identifier with an associated unique participant identifier number. The method is implemented in processes by various computer systems. In a participant identifier detector having a processor, a memory, a clock, and participant identifier detector transceiver that is locatable at the detection point, the process includes receiving the participant identifier number, the participant identifier, identifying a tag read time of the received participant identifier read, and transmitting the participant identifier number and the identified participant identifier read time. In a handheld device having a processor, a memory, a clock, a user interface, a communication interface, and a location detection device, the process includes determining a geographic location of the handheld device, reading the participant identifier number of the participant identifier, determining a time of receipt of the participant identifier number by the handheld, and transmitting the determined geographic location of the handheld device, the handheld read tag number and the handheld determined time. In a timing system having a processor, a communication interface, and a memory, the process includes storing a location for the participant identifier detector, receiving the geographic location of the handheld device, the handheld read tag number and the handheld determined time from the handheld device, determining that the timing system has not received a usable tag read time from the participant identifier detector for the same participant identifier number as the handheld read tag number, determining a delta time from the difference in the location of the GPS tag reader and the location of the handheld device, calculating an adjusted time for the participant identifier number from the handheld determined time and the determined delta time, and storing the calculated adjusted time as a time of passing of the detection point for the participant identifier number.

In one embodiment, the timing system receives one or more participant identifier reads for a participant identifier number with one or more identified participant identifier read times; and determines that such received tag reads do not accurately determine the time of passing of the participant at the detection point and therefore is has not received the usable tag read from the timing system. In some embodiments, the timing system determines a velocity of the participant approaching the detection point from the received one or more tag reader from the participant identifier detector, and calculates the delta time is based on the determined velocity.

In some embodiments, the timing system receives a plurality of tag reads for a plurality of participant identifier numbers each having a plurality of identified participant identifier read times, one of which is the participant identifier number associated with the participant. The timing system TS determines from the plurality of participant identifier read times for the plurality of participant identifier numbers an average velocity of the plurality of participant identifiers approaching the detection point. In such embodiments, the timing system TS can use determining of the delta time based at least in part on the determined average velocity of one or more of the participant identifiers or the average velocity of two or more participant identifiers through the monitored zone of the participant identifier detector that is generally immediately prior to or after the detection point.

In some embodiments, the location detection device receives an activation input via the user interface and in response, initiates the transmission of a secondary location and an identification of the secondary location to the timing system. In the timing system, the secondary location and the identification of the secondary location are received and stored. The secondary location can be any location but in some embodiments includes the detection point, the location of the participant detector system TRS or a relocated one of either that may occur following initial setup or during an event.

The user interface of the handheld device can also receive a user activation input to take one or more participant identifier reads. For instance, the user may point the handheld device at a participant before or after a detection point to obtain the tag read and time of that particular participant. This can also be used, as described herein, to scan for a bar code on the participant such as their bib, or to take an image of the participant, the participants bib, face or otherwise, wherein such can be associated with the particular participant identifier read and tag number and time obtained therefrom. In other embodiments, the user interface can program the tag reader to take multiple tag reads, only a single tag read, multiple tags or a single tag. Generally, in such embodiments, the participant identifier detector transceiver selectively reads the participant identifiers responsive to the received user activation input or computer programming or instructions related or defined from such user activation input.

In some embodiments, the handheld device receives an input via the user interface for initiating a capturing of an image. As noted such device can include an image capture device or camera for still or video capture. Such can be selectively captured when the targeted item or person is in proximity to the handheld device, such as where the handheld device is being aimed or pointed. In such embodiments, the handheld device transmits the captured image, and in the timing system receives the captured image and stores the received captured image in the timing system memory.

In some embodiments, the handheld device can associate the captured image with the participant identifier number as received by the participant identifier detector transceiver and then transmit the associated participant identifier number with the captured image. In other embodiments, there is no association, except possible by the time stamp of the image capture. In the timing system, the captured image is received and can be associated with the received participant identifier number or a tag read from the handheld device or the TRS based on a comparison of the timestamps. The timing system TS can then store the received captured image with a file associated with the participant identifier number.

As noted above, in some embodiments, the participant can have an associated bar code such as on his person, his bib, his bicycle, his auto or otherwise. The handheld device can be used by the user to receiving an input via the user interface to initiating the scanning of the bar code. The handheld unit can scan the bar code that is in proximity to the handheld device and transmit the scanned bar code with the captured image. In some such systems, the scanned bar code can be time stamped or associated with the participant identifier number of a participant identifier read, or a captured image.

FIGS. 1-9 and 15 will be described below. Referring now to FIGS. 10-14.

Figure 10:
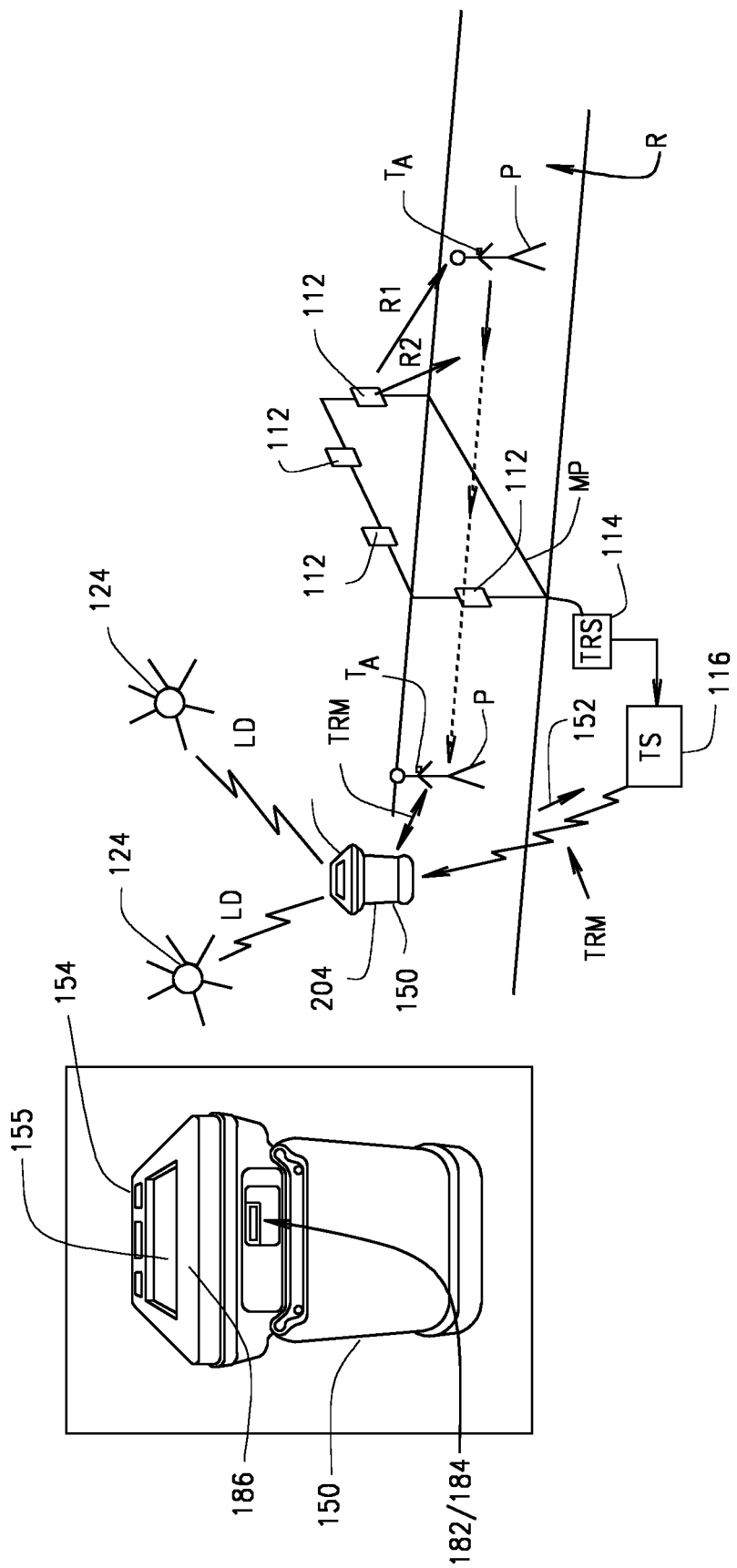
FIG. 10 is a diagram of use of a highly portable METS as used on an event course by a participant with an RFID tag according to one exemplary embodiment.

FIG. 10 is a diagram of use a METS 150 during an event. The user of the METS can be positioned after the automated participant detection system 114 and/or its detectors/antenna 112. As participant P with the participant identifier TA passes the detectors 112, the participant detection system 114 attempts to read the participant identifier number from the participant identifier and provide it to the timing system 116. A user of the METS 150 can be positioned along participant route R at any point and is not limited to a location. The user can manually detect the participant identifier number or identification therefrom such as by activating one of the reading functions of the METS 150 such as the participant tag number such as an RFID tag number, scanning a bar code, capturing an image or the like. In the alternative, the user can ask or otherwise obtain the participant number or name from the passing participant P and manually enter that via METS user interface 154. The METS 150 obtains its then current location from location system 124 as well as the current time from clock 204. All of this collected participant passing/detection data is provided such as by wireless transmission as TRM 152 to the timing system 116. The timing system 116 has the current location of the automated detection system TRS 114 and detectors 112 as well as the location of the monitored point MP for which automated participant detections and reads are obtained. The timing system 116 can then adjust the timing of the METS 150 provided detection based on a difference in the geographic position of the METS 150 as located by the user thereof and the monitored point MP.

Figure 11:
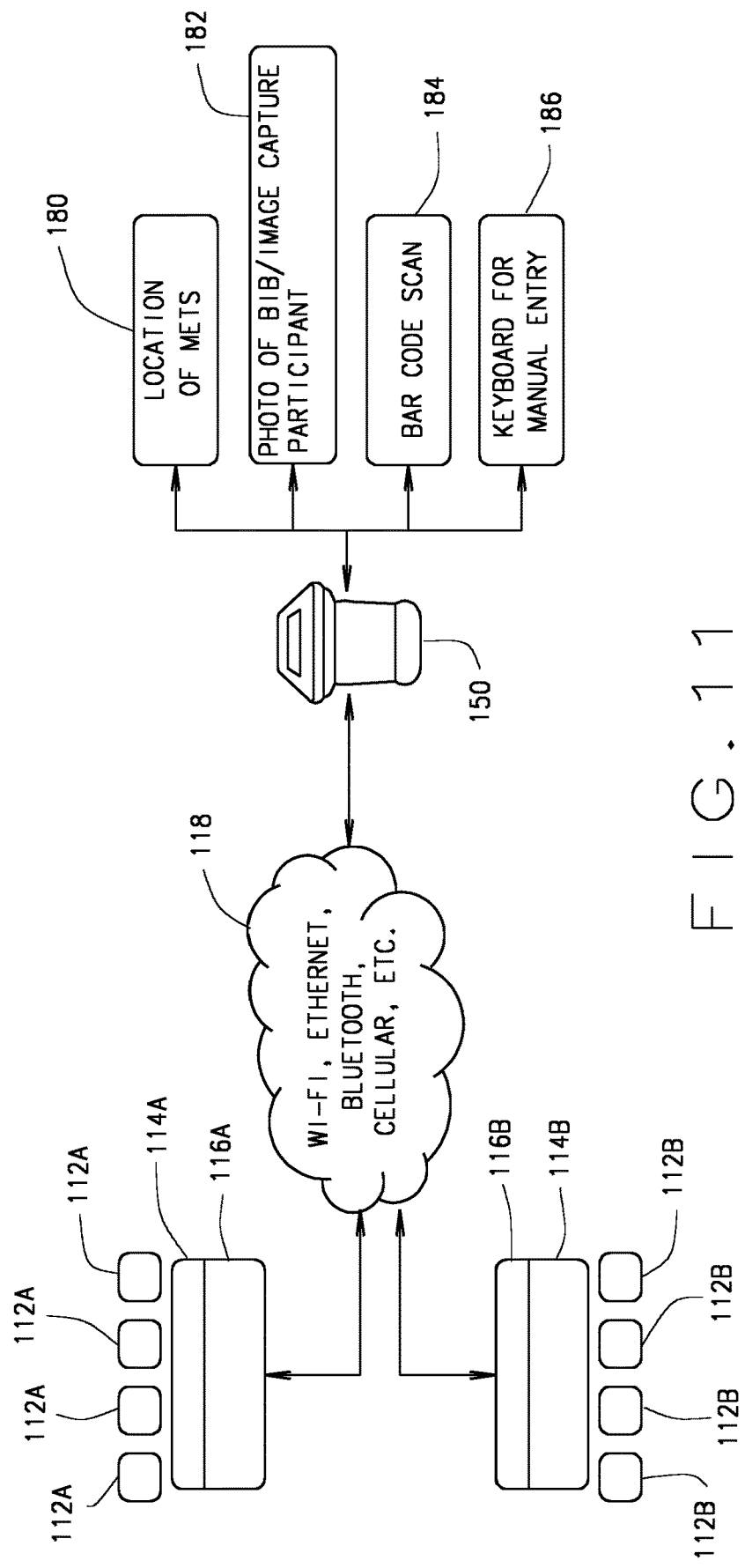
FIG. 11 is a diagram of a highly portable METS and the interfacing with remote systems according to one exemplary embodiment.

FIG. 11 is a diagram of a highly portable METS and the interfacing with remote systems according to one exemplary embodiment. This embodiment illustrates the components of the handheld device including the location detection via the GPS position device 180, the image capture device 182, the bar code scanner 184, and a manual user interface 186 that can include a keyboard like capability for receiving a manual input from the user. The METS 150 communicates with the TS 116 and/or TRS 114 via any suitable means. As shown here, the METS 150 communicates with one or more timing systems 116A, 116B via network 118. Each of timing systems 116A, 116B, has one or more participant detection systems such as RFID tag readers 114A, 114B and each of such systems can have a plurality of detection transceivers 112A, 112B.

Figure 12:
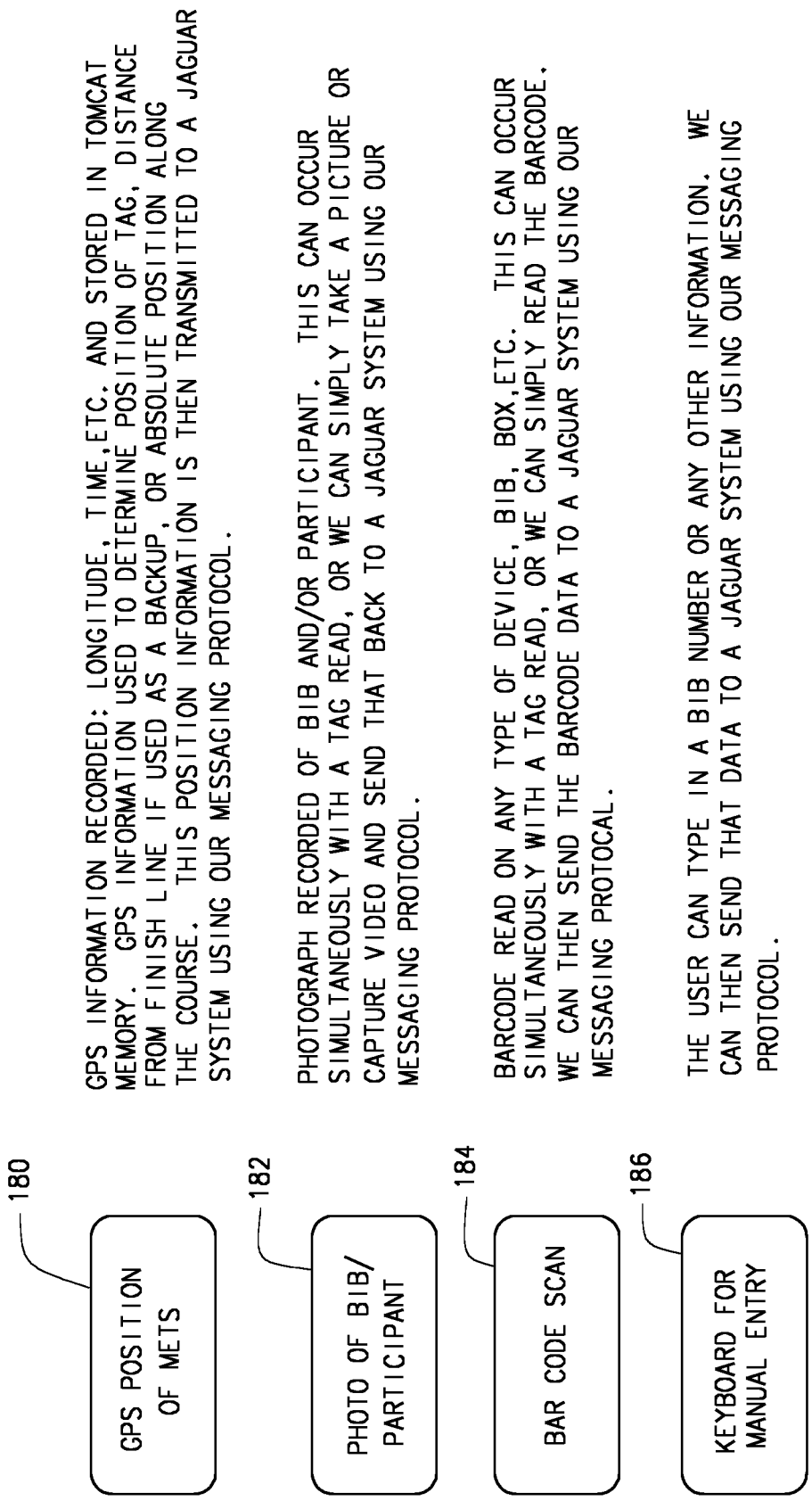
FIG. 12 is listing description of a highly portable METS device interface, scanners, readers, and inputs according to one exemplary embodiment.

FIG. 12 is listing description of a highly portable METS 150 device interface, scanners, readers, and inputs according to one exemplary embodiment. This figure describes that various functions of a handheld METS device according to one embodiment, the highly portable METS 150 as used on an event course by a participant P with a participant identifier according to one exemplary embodiment. As shown and described as the ITS METS, the device 150 can include the features shown and listed and otherwise described. As noted above, a METS 150 can include a location device or capability for determining a geographic location such as a GPS receiver so that the METS can include the determined location for providing such to the timing system 116. The METS 150 can also include an image capture device 182 such as a camera for taking still or video images. The user of the METS 150 can record or capture the image of a participant such as their face, or participant's identifier such as a bib number or car number or the like. These captured images are provided by the METS 150 to the timing system 116. Similarly, the METS 150 can include a bar code scanner or reader 184 wherein the user of the METS 150 can manually scan a bar code associated with the participant P as the participant P passes the user. Also, the METS 150 can include a key board or key entry user interface 186 such as a touch screen for receiving a manual input from the METS 150 user for data such as a manual number entry as viewed by the user.

FIG. 13 is a process flow for use of a participant identifier read by a highly portable METS 150 for determining a time of passing of a participant P according to one exemplary embodiment. As described in this process, Steps 1 through 6, the METS 150 can obtain participant identifier data such as a participant identifier number, image, or barcode, and time stamps the receipt thereof along with the current location of the METS 150. Further, it is noted in step 6 that such stored user time, being based on the adjusted time and the delta with the handheld captured RFID read and time of the read can be so indicated in the memory or store of the timing system TS 116 or TRS 114.

Figure 14:
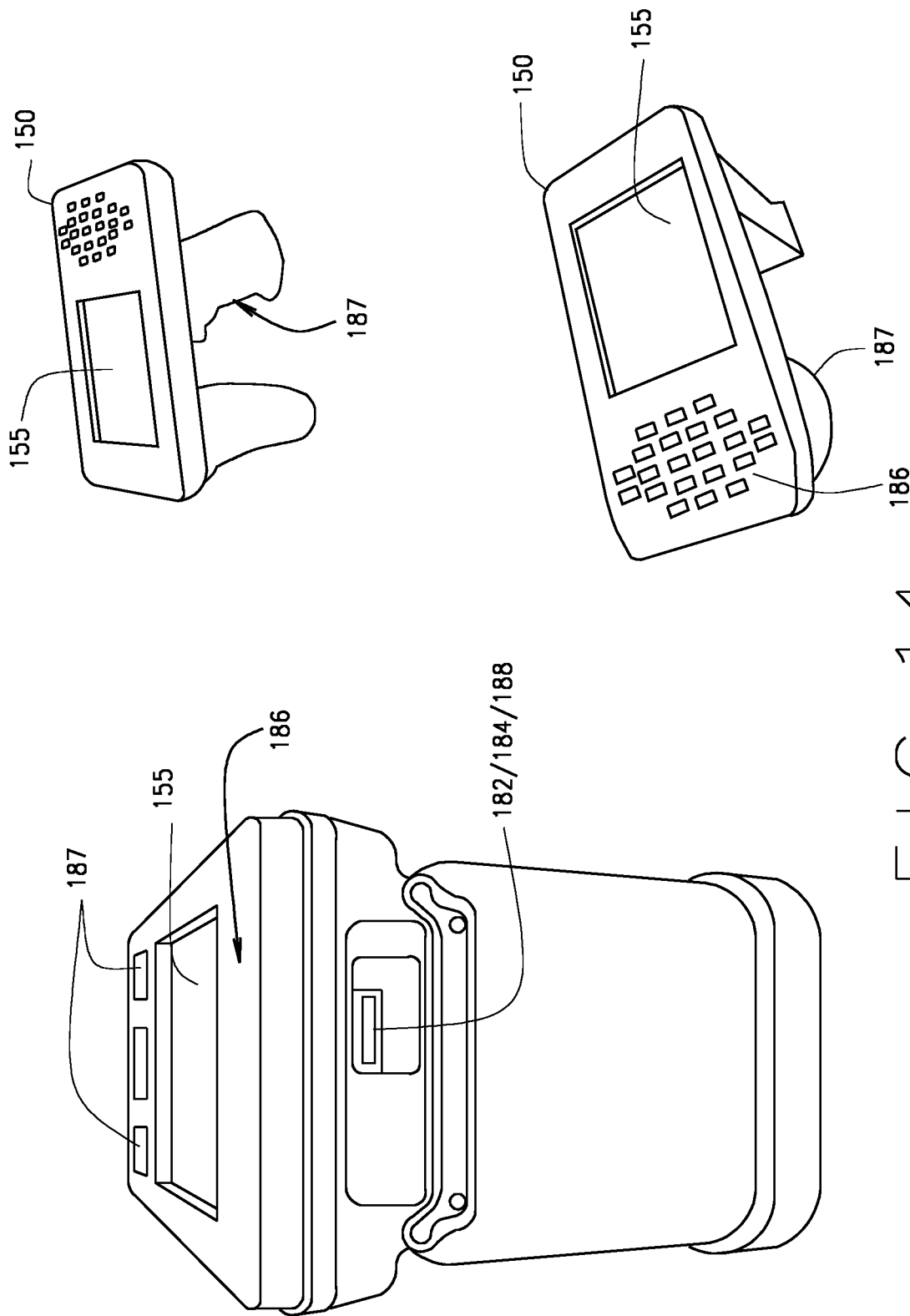
FIG. 14 is a depiction of a highly portable METS device according to one exemplary embodiment.

FIG. 14 is an image of one specialized METS 150 having a user interface 154, a user display 155, a manual entry such as a keyboard 186, a barcode scanner 184, a camera 182 and/or a RFID tag reader 188.

Manual/Remote Timing (METS) System Interface

As described above, the highly portable device can also be referred to as an Integrated Timing System (ITS) Manual/Remote Entry Timing System (METS). For the following such systems will simply be referred to as METS or a timing system TS system component, or an ITS NET compatible system or component. Generally, the system and method associated therewith is a software implement method and system that runs on computing devices and uses the communication of messages to send race participant information over a network to one or more handheld METS configured, enabled or compatible timing system TS/ITS system component. The handheld METS system includes a handheld METS with handheld METS remote user interface.

Generally as described hereafter, the METS includes any handheld METS systems or any highly portable METS system. Such METS systems are configured as an ITS system component and can include, but is not limited to the ITS system user or control console, one or more ITS participant identifier detector systems (TRS), and ITS announcer system, by ways of example. Users of the timing system TS/ITS with METS system can enter participant identifier reads that may have been or were missed by the automated RFID participant detector system TRS. In some embodiments, the METS entered METS tag reads can be in addition to or supplemental to the RFID TRS tag reads such as to verify and provide a manually entered read for analysis and integrated timing system TS/ITS system adjustment. The ITS systems as described herein have been generally described for timing of race events. Such an exemplary embodiment is only for the sake of example. In such example ITS systems, the race participant names or assigned race numbers are utilized by the ITS system for logging, tracking and reporting of participant activity in the race. The TRS tag readers read the participant identifiers associated with the participant or object associated therewith such as a bike, helmet, bib, car, motorcycle or similar object when the tags are within participant identifier read range of the participant detector system TRS.

The participant detector system TRS transmits the tag read information to an ITS system using a series of formatted messages. An intelligent buffer in the ITS system is provided to manage the flow of messages between the ITS system components over an ITS network or networks. There can be a single network, but with different types of communication facilities forming the ITS network. Various or different ITS system components that implement the METS system can utilize the same or different communication facilities within the ITS METS network. These can include, but are not limited to, wired, wireless, satellite, cellular, serial, or private networks. As will also be discussed, in one embodiment, the METS system remotes utilize a wireless communications interface with the METS configured ITS components as many or most of the other ITS system components are at least temporarily fixed known position. However, the METS is often a highly portable user interface or application that can be implemented in software on a laptop computer, portable tablet, a tablet PC, smart phone or customized hand held unit. As such, the user of the METS can move and is highly portable and a wireless interface between the METS and any other METS configured ITS system can provide a preferred communication link. Additionally, any of the METS configured ITS system components can act as a gateway with the METS component or components. In such applications, the METS may communicate wirelessly through a first METS ITS component, but such messages are relayed on other METS configured ITS system using a wired communication facility.

Generally, as described herein, the METS system and METS configurations in the ITS system components are software-based applications and communication interfaces. The communication interfaces are used by the overall architecture of many embodiments of METS to include TCP/IP and UDP messages to communicate the manually entered race participant information at the METS remote to METS compatible ITS system components. The ITS system equipped with METS provides a backup capability to any METS compatible or equipped ITS system, such as a sports timing systems wherein the automated participant proximity detector such as participant proximity detectors such as RFID readers can fail to read one or more participant identifiers at a particular detection location. The METS system can be loaded on multiple computing devices and used at the same monitored location, or at numerous monitored locations anywhere on a racecourse or other traveled path. The METS system transmits formatted messages to a receiving system, which can be an ITS system with one or more RFID participant detector system TRS. For example, typically each participant detector system TRS monitors a single monitored point such as a finish line or intermediate point, and each has one or more RFID antenna associated therewith. In addition, the METS system can record received manual entries to a permanent data store in the METS in case a network connection fails, or in case no ITS communications network is available. This allows the METS system to be used at monitored locations on a course or path of movement where a communication network is not available. Also, as one skilled in the art would understand after reading this disclosure, a user of the METS and METS ITS systems can manually time an event by simply typing in all of the bib numbers and time the race, with synchronized times, and adjusted times, without ever using a participant proximity detector TRS such as an RFID reader.

In one embodiment, a system for timing of a passing of an object past a monitored location where the monitored location is being monitored by timing system having at least one automated object detection system for wirelessly detecting the passing of the object at the monitored location. The system comprises a remote entry computer system having a processor for executing computer executable instructions, a clock for determining a present time, a user interface for receiving user input data, a memory being a computer readable medium storing the computer executable instructions and the received user input data, and a communications interface for communicating with the timing system. The remote entry computer system can be any suitable computer system such as, for example, a laptop computer, a smart phone and a tablet PC.

The METS system includes a computer readable medium including the computer executable instructions for performing the method of receiving the user input data at the user interface, receiving from the clock a user data input time associated with the receipt of the received user input data at the user interface, and storing the received user input data and the user data input time in the memory. The computer executable instructions also include the method of creating a received user data message including the stored user input data and a time value as a datagram message and transmitting the user data message over the communications interface to the timing system.

In some embodiments, wherein the computer executable instructions further include performing the method of storing in the memory an offset time value, and determining an adjusted time from the user data input time and the stored offset time value, wherein the creating of the received user data message includes the adjusted time as the time value.

The offset value can be provided in a number of different manners. In one embodiment, the user interface is configured for receiving the offset time value that is subsequently stored in the memory. For example, the user of the METS may be instructed or have knowledge of the expected offset time and enter that time using the METS remote user interface. The METS remote may also have the ability to determine the correct suitable offset based on its known position relative to the monitored location. For example, the METS system may receive the GPS coordinates for the monitored location. The METS system may also receive its own GPS coordinates either from a remote system such as a TRS or ITS, or may have its own GPS receiver. Once it knows its GPS location, it can determine its current location and the computer executable instructions can determine the offset time value based on the determined current location and in some cases the known or provided or stored GPS location of the monitored location. In other embodiments, the offset time can be provided to the METS remote via the METS communication interface that is subsequently stored in the memory.

As addressed herein, the METS remote can be configured for receiving a clock synchronization message including a system time value from the timing system. In such embodiments, the clock of the METS remote can be configured to set the present time of the clock to the value of the received system time value. This can be value that a user entry is initially stamped or associated with and to which the offset is later applied. As will be described at least one of the ITS and or TRS or other object detection system can be configured to generate a clock synchronization message that includes a standard clock time for all ITS and METS system components.

The METS remote can also be configured to receive a verification message, wherein the computer executable instructions include the method of creating an verification response message in response to receiving the verification message; and transmitting the verification response message over the communication interface after the creating thereof. The ITS and/or TRS or other object detection system or any METS coupled and compliant system can also receive and/or generate a verification message and receive responses therefrom.

Figure 3:
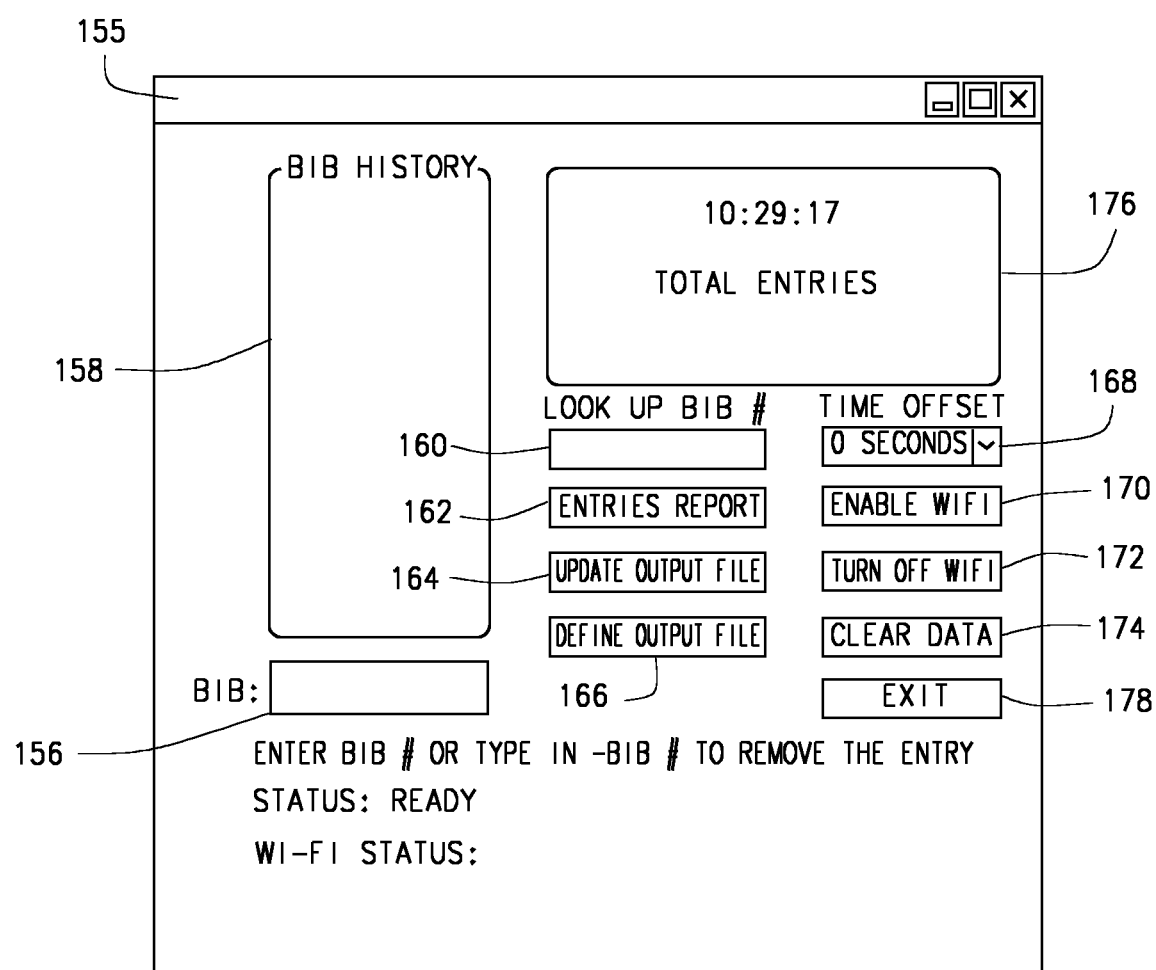
FIG. 3 is a user interface for a remote entry computer system (METS) for receiving manual data entries from a user according to one exemplary embodiment.

As will be addressed below with regard to FIG. 3, the METS remote user interface can include a key pad and a display. The user interface can be configured or customized as shown in FIG. 3 to receive user input data that can be input rapidly during an event. This user input data can be any data, but can include an identification number such as a bib or object or participant number, or a name or other identification of the object for which the time entry is being manually entered and recorded by the METS remote system.

In some embodiments, the METS remote user input data can include an identification number associated with the object. The user of the METS remote may wish to retrieve information from the ITS system associated with such identification number including, but not limited to the name, description or a picture of the object or participant. As one example, where the METS remote user interface includes a display, the user of the METS remote can input the bib number of the participant and the METS remote computer executable instructions can format and transmit an image request message including the identification number over the communication interface requesting an image file associated with the identification number from the timing system or another remote system. In such cases, the ITS or TRS would receive the image request message, search its database records for an image as requested and prepare and transmit an image message containing the requested image file to the METS remote. The METS remote would then receive an image message including the requested image file over the communication interface and would display the image contained in the received image file. This can be used to verify the identity of the particular participant and with the bib number.

As described also herein, as a mobile unit that may be wirelessly connected using datagrams. As such, the METS remote can be configured to limit the protocol or communication facility overhead by sending duplicate copies of the same message rather than using an acknowledgement protocol. In such embodiments, a second or third copy of the same message can be transmitted after a predetermined or random time following the prior transmission. The receiving ITS or participant detector system TRS can receive each and keep, discard or ignore any received duplicated messages. As described herein, the METS remote can be highly mobile. As such, the communication interface can be wired or wireless for wirelessly communicating with the timing system and or TRS tag reader system. These can include a Wi-Fi interface, or any other radio, satellite, or light wave wireless interface.

As this can be a wireless network, such networks can fail or the position of the METS remote may be such as to inhibit the wireless communication between the METS remote and the intended recipient ITS or participant detector system TRS. In such situations, the METS remote can be configured to detect a current inability of communicating with the timing system over the communication interface. The system can suppress the transmitting of the user data message in response to the detecting of the current inability to communicate and monitor the status of the communication interface to determine a renewed ability to communicate with the timing system over the communication interface. When the MET remote identifies the renewed ability to communicate with the timing system, the METS remote can begin to retransmit the stored but suppressed transmission of messages.

In another embodiment, a system for timing of a passing of an object past a monitored location. The system comprises a computer implemented timing system, an object detection system, and a remote entry computer system. The computer implemented timing system has a data interface for communicating over a data communication network, a memory with executable instructions for operating the data interface to communicate and for storing an identification of the timing system, event data, and object data, the object data including an object identifier for uniquely identifying each object and object timing data, and a processor coupled to the memory and the data interface for executing the executable instructions for operating the data interface to communicate datagram messages over a stateless packet data communication network. The object detection system is communicatively coupled to the timing system and positioned at the monitored location. The object detection system has a processor, memory and communication interface and at least one antenna for wirelessly detecting a passing of the object by the monitored location. The remote entry computer system has a processor for executing computer executable instructions, a clock for determining a present time, a user interface for receiving user input data, a memory being a computer readable medium storing the computer executable instructions and the received user input data, and a communications interface for communicating with the timing system. The remote entry system includes a computer readable medium including the computer executable instructions for performing the method of receiving the user input data at the user interface, receiving from the clock a user data input time associated with the receipt of the received user input data at the user interface, and storing the received user input data and the user data input time in the memory. The computer executable instructions also include the method of creating a received user data message including the stored user input data and a time value as a datagram message and transmitting the user data message over the communications interface to the timing system.

As addressed above, the METS reads can have their times adjusted by an offset to account for the position of the METS remote being apart from the monitored location. In such situations, the timing system or TRS or other object detection system can determine the appropriate offset time value, and create and send the message that includes the determined offset time value to the METS system. The determination of the offset time value can include a variety of different factors that can include, but not limited to, one or more of a distance between the remote entry computer system and the monitored location, a determined speed of one or more objects passing the monitored location, and a determined change in speed of one or more objects passing the monitored location.

METS Exemplary File Structure

Primary METS File Structure

An ITS system can have multiple files that are used within the system, but the two files the user will need to access are the Participant identifier Output File and Database File. The file formats documented below are subject to change, so please check with us periodically for updates.

METS Participant Identifier Output File

As the ITS software is running at a race and collecting participant identifier times, it will immediately write the participant identifier read information to a text file. The user will decide the name and location for the file. This file is updated in real-time by the ITS software as the race progresses and it contains the following information: Antenna#, Bib#,Bib#,"Time" The file uses a comma-delimited format and the time field has quote marks.

This format is readable by a spreadsheet or many third party programs. The user can simply ignore the Antenna # field. It is used internally by the ITS system. The Bib # field appears twice and this is not an accident. The ITS system repeats this number because several third-party programs require this format when importing our file. The final entry is the time of the participant identifier read which is in the format of "HH:MM:SS".

In the ITS system, the participant identifier number is the same as the bib number worn by the participant. Thus, for a race with perhaps 500 participants, the Bib # field may contain a value from 1 to 500. The largest value allowed within ITS for a Bib # field is 99999. Future versions of the software will permit bib numbers up to 500000.

The following is a sample of a typical ITS output file:

0,41,41,"14:27:42"
0,47,47,"14:27:44"
0,39,39,"14:27:46"
0,14,14,"14:27:48"
0,32,32,"14:27:50"

The ITS system is capable of reading a participant identifier multiple times as it approaches a monitored point. Thus, an output file may contain multiple entries for the same participant identifier. The last entry is the final read on a participant identifier. For example, the following output file shows that a single participant identifier was read multiple times as the runner approached the finish line in a race.

0,32,32,"14:28:20"
0,32,32,"14:28:21"
0,32,32,"14:28:22"

As ITS reads timing participant identifiers, it appends new data to the file and continues to do so during the race. Thus, the user should never attempt to modify or lock the file while a race is ongoing. It is often desirable to read the file once the race has concluded, or while the system is not actively reading timing participant identifiers.

METS Output File

Typically, the METS output file will only contain one entry since most runners can pass through the monitored point in one second or less. However, if a race has a number of walkers, the user could easily see 4 to 5 entries for the same timing participant identifier as the walker approaches and goes past the finish line.

As the ITS software is running at a race and collecting participant identifier times, it will write these times to a text output file. The user can decide the name and location for the file using this default option. If the user chooses not to define it here, the software will ask the user to define it before it starts collecting participant identifier times. By defining the standard output file here, the user can save some time on race day. This file is updated in real-time by the ITS software as the race progresses and it contains the following information: Antenna#,Bib#,Bib#,Time. This format is readable by a spreadsheet or many third party programs such as Race Director.

It should be noted that in multi-unit or component ITS systems, the record may not be for an Antenna#, but would be an ID or name for any of the originating systems, including, a secondary ITS system, a METS, or similarly connected or interoperable system.

METS Message Transmission of Duplicated Messages

The ITS system or any ITS component thereof can be configured as an option for acknowledgement for use in with METS. However, use of an acknowledgment in a communication protocol creates considerable overhead on the network especially where retransmission of un-received messages has occurred. Instead of needing an acknowledgement, in some embodiments the METS systems, as will be described, the METS system can be configured to send more than one communication message (also referred herein as a packet, but it should be understood that such message may be other than a packet) to ensure that at least one of the dual messages arrives at the METS destination system. Of course one skilled in the art will understand that more than two messages could also be sent in some embodiments, or the same messages sent multiple times in a broadcast or multicast mode. The ITS system component that is METS enable can receive one or more of the same messages from the METS system and store each or store a first and, recognizing the duplication of a subsequently received message, discard or ignore the subsequently received duplicate messages.

METS System Remote Synchronization

When a system receives the TSYNC time, such as by a METS (whether manually sent or automatically periodically sent as in the new embodiment), the METS software can also adjusted the TSYNC message based on an expected transmission delay. The manually entered event is time stamped with the synchronized time that is the same as that of the ITS. If so, no adjustment may be required. As such, with the use of the TSYNC being sent by the ITS to the METS for providing a synchronization of the internal clock of the METS with that of the ITS, the adjustment is not only for time standards, but can also deal with a situation where the time recorded for the participant is actually behind the time they truly finished a race, or passed a monitored point. For example, if a runner is captured on a backup timing system that is 100 feet behind the primary system, their clock time is correct because the TSYNC messages have done their job. However, the time at this backup point may be 3 to 4 seconds later than the primary system read time. If a backup METS system is used such as to make sure a time at the primary point is missed or improperly read at the primary, the METS backup time is used and now subtract an adjustment time and bring the participant identifier read back to what it might have been if the ITS system had read the participant identifier at the primary location. It essentially gives us a second chance to read the participant identifier and adjust the time so the runner appears to have been recorded at the primary point.

METS System Remote Offset

The METS has an internal clock and received the time synchronized to the ITS system clocks as described above. However the METS can also be provided with an internal time offset. This METS office value is only used if the user is using a METS that is spaced apart from the primary TRS monitored point, such as the finish line. Recall that there can be a secondary TRS monitored point that can be 25 to 30 feet behind the primary monitored point (finish line) that can also provide the user with an improved chance of reading all participant identifiers. With two participant detector system TRS operating at a finish line, the combined read rates are typically better. However there is no guarantee of 100 percent read rate due to many conditions outside of the control, but nonetheless, redundant systems generally provide improved ITS system read results. When the user has decided to place a METS system at the finish line, the user will want the time recorded for the finisher to be as accurate as possible. Thus, the METS offset allows the METS user, the ITS user, or the ITS system itself to define a METS Offset amount of time that will be subtracted from the METS recorded time for determining the time sent by or from the METS remote. For example, the user can set the METS offset value from 0 to −5 seconds, if the METS remote user is timing a 10K race and is positioned 25 feet behind the finish line.

In other embodiments, the METS system can be configured to receive remotely provided values for the offset to be used by the METS remote. As described in the messages below, a TROFFSET message can be provided by a participant detector system TRS or by the ITS system to the METS for providing a revised or replacement offset time value to the time stamp of the manual entry. When the METS or the ITS system receives the TROFFSET message and the offset time value contained therein, the value of the READ message can be adjusted by the new offset time value to more accurately reflect the time of passing of the participant identifier at the monitored point, even though the METS reader is positioned apart from the monitored point. As will be discussed below, the amount of the TROFFSET can be calculated dynamically based on the performance, speed and acceleration or deceleration of the participants after passing the monitored point.

As noted, the METS may perform the offset function. When this occurs, the READ message can be amended by an indicator or additional message therein to indicate the time as indicated by the READ message reflects the offset value and not the value of the TSYNC. Also, the READ message can reflect that the message is the TSYNC value if the ITS METS system is set up to have an ITS component other than the METS perform the offset time before being recorded in the ITS database. Such time offset message indicators can be a single character or bit added to the READ message as described below. This can also be handled by use of the antenna# field entry or the like.

METS Additional Embodiments

The METS is also capable of implementing other features and functionality of some of the other ITS system components to increase its value to the user and to improve the functionality of its use at events. Several of these will now be briefly discussed.

The ITS system and METS system can be configured in some embodiments, so that the ITS system or component requests the METS system to resend a previously sent message using the RESEND message. While described above, the UDP datagram messages may not be acknowledged or guaranteed, the ITS system component may have a need for a particular READ message sent by the METS to be resent. For instance, the ITS system component may want to verify or update the message such as to compare the message to a TRS received message for determination of the METS reader offset time as one example.

The ITS system and METS system can also utilize a verification message or process by use of a remote signal message (RSIG). This can be particularly useful with the METS remotes as they are mobile and may or may not have continuous communications with the other ITS system components. This message can be used as a separate keep alive or verification of the operation of the METS remotes within the overall design METS configured ITS system.

The METS and ITS system can also utilize a loop up capability by sending a LOOKUP message. The METS may not be configured with the entire ITS database and listing of tags. As such, the user of the METS may want to request the name or tag number of a participant that the METS user witnessed at a particular location. Similarly, the user of the METS may want to enter a tag number or name and request that the ITS system provide a picture or image or video of the participant by using the request image command RQIMAGE. This may be useful for enabling the METS user to verify the participant or to identify the participant at the particular location of the METS remote user. This would inherently include use of the STIMAGE message would provide the image from the ITS system back to the METS system.

Of course, those skilled in the art would also understand that the METS systems may also wish to transmit other commands between METS compatible systems. As such, the COMMAND message can be used for administrative and other purposes in support of the herein described functionalities.

Referring now figures, FIG. 1 illustrates a timing system (ITS) 100 includes as single tag reader system (TRS) 114 at detection location 102 positioned on a racetrack 104 in which a participant 106 (also referred herein as P) having a participant identifier 108 is traveling along route 110 with a velocity $V_A$. As shown the TRS 114 has a plurality of antennas 112 positioned about a particular location on the track 104 that is the monitored location MP and by which the participant 106 travels when traveling along route R 110. TRS 114 each include a computer system (also generally referred to as TRS 114) that is communicatively coupled to the antennas 112 via a communication link 120. In this exemplary embodiment the monitored point MP is also positioned at the reference line R, which can be equated to a starting line, a checkpoint, or a finish line on racetrack 104. The TRS 114 is communicatively coupled to integrated timing system (ITS) 116 via communication network 118. TRS 114 transmits one or more tag read messages TRM to the timing system TS 116. A plurality of METS remotes systems 150 are positioned at a spaced apart location from the monitored point MP. As such, METS 150A and 150B are positioned at a distance of $DM_A$ from the monitored point MP, and METS 150C and 150D is positioned at a distance of $DM_B$ from the monitored point MP. Each METS 150 (150A, 150B, 150C, and 150D) is wireless coupled or communicative with the timing system 116 via wireless link 152, either directly as with METS 150A, 150B, and 150C, or indirectly where METS 150C first wirelessly communicates with METS 150A, and then METS 150A relays such METS 150B messages between METS 150B and ITS 116. While not shown, one or more of the METS 150 can also wirelessly communicate with the TRS 114 if the TRS 114 is equipped or configured for METS 150 compatibility.

Figure 2:
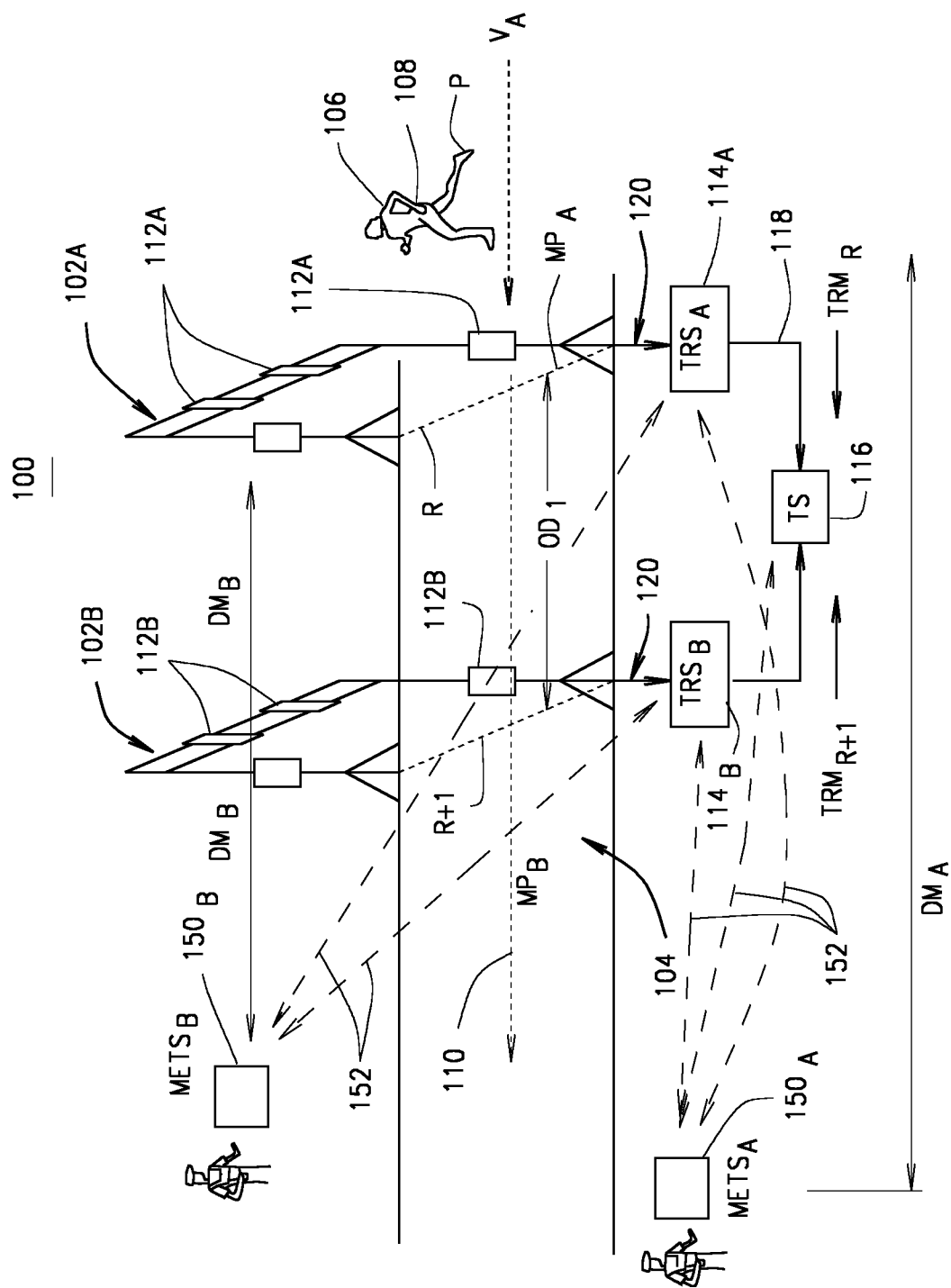
FIG. 2 is an illustration of a timing system at a monitored location with a two automated participant proximity detector shown as tag reader systems and two remote entry systems each spaced apart from the monitored location according to a one exemplary embodiment.

The system 100 of FIG. 2 is similar to that of system 100 of FIG. 1 except in this exemplary embodiment, the system 100 has two tag readers 114A, 114B at detection locations 102A and 102B spaced apart from one another and positioned on a racetrack or course 104 in which a participant P 106 having a participant identifier 108 is traveling along route 110 with a velocity $V_A$. As shown each tag reader system 114A, 114B has a plurality of antennas 112A, 112B, respectively positioned about a particular location on the track 104 and about participant travel route 110. TRS 114A and 114B each include a computer system each of which is communicatively coupled to its respective antenna 112A, 112B via a communication link 120 at detection locations 102A, 102B, respectively. The TRS 114A is positioned about monitored point $MP_A$ and TRS 114B is positioned about monitored point $MP_B$. In this exemplary embodiment $MP_A$ is also positioned at the reference line R, which can be equated to a starting line, a checkpoint, or a finish line on racetrack 104. The $MP_B$ of $TRS_B$ is positioned at an offset distance $OD_1$ from reference line R, and is also referred to as position R+1. Each $TRS_A$ 114A and $TRS_B$ 114B is communicatively coupled to timing system (TS) 116 via communication network 118. TRSA 114A transmits one or more tag read messages $TRM_A$ to the timing system TS 116 and $TRS_B$ 114B transmits one or more tag read messages $TRM_{R+1}$ to timing system TS 116. As shown in this embodiment, a first METS 150A is positioned at a distance $DM_A$ behind monitored point MP and a second METS 150B is positioned at a distance $DM_B$ behind monitored point MP. METS 150A wirelessly communicates with $TRS_A$ 114A, $TRS_B$ 114B and timing system TS 116. METS 150B wirelessly communicates with only $TRS_A$ 114A, $TRS_B$ 114B which may be due to the location of METS 150B not being within range of the TS 116. In such situations, either $TRS_A$ 114A or $TRS_B$ 114B can communicate directly with METS 150B, or one or both can relay the communications between METS 150B and TS 116 over communication network 118.

FIG. 3 is a user interface 154 for a remote entry computer system (METS) 150 for receiving manual data entries from a user according to one exemplary embodiment. As shown in FIG. 3, the METS 150 can include a user interface 154 with screen or display 155. This can include a text box 156 on the left side of the screen 155 with a label called "Bib:" that is where the user will enter the bib numbers of the race participants. As the user types in bib numbers, the bib numbers will display in the Bib History box 158 on the screen 155. If the user make a mistake and enter the wrong bib number in box 156, the user can simply type in a – sign with the bib number and it will be removed from the history in box 158. The user can have about 5 to 10 seconds to remove the entry; otherwise it may be committed to the history and transmitted to the ITS and thereafter recorded into the ITS database at the main ITS. The user interface screen 155 also includes a bib look up field 160 that enables the user to look up bib numbers from the memory. The Look Up Bib # field or box 160 allows the user to quickly look up a race participant by using their bib number. The messages sent from the METS system 150 can be a plain text message. The use of plain text messages permits the messages to be captured by third-party software. The user interface screen 155 also can include an Entries Report field 162. This allows the user to view all bib numbers entered into the METS system 150 via the user interface 154. The user can print the report, save it to a text file, or export it to a spreadsheet.

The user interface 154 can also include an Update Output File entry 164 or entry. This entry 164 enables the user to periodically flush the bib history from the METS 150 memory or store it on a local disk drive. As the user enters bib numbers in box 156, the entered bib numbers are kept in memory and not written to the disk drive until the user select option 164. If the user has not first defined the name of the Output file, the user will see a window appear asking the user to select an existing file name or create a new file name. The user interface 156 includes a Define Output File 166 field that allows the user to define the name of the Output file that will contain the manual entries the user is making with the METS software.

The user interface screen 155 can also include an input for receiving a user defined offset time by Time Offset field 168. This field 168 can include a drop-down menu allowing the user to define how many seconds the user wish to have added or subtracted from the time being written to the Output file, or the main ITS if the user are using a Wi-Fi connection. If the user are using the METS software at a distance of perhaps 20 feet behind the finish line, the user may wish to subtract 2 or 3 seconds from the time being recorded as the user create manual entries. This is important because the runner will have crossed over the finish line a couple of seconds prior to the user making the manual entry. Of course, if the user is using the METS software at the finish line, there is no need to adjust the time. If the user is using the METS software 50 feet in front of the finish line, the user may wish to add 2 or 3 seconds to the time recorded. Of course, the METS user could be as much as or more than 100 feet from the monitored location or finish line and the offset time should be adjusted manually or automatically as described below.

The user interface screen 155 can also include a field to allow the user to activate or initiate the wireless or wired communications interface with the METS enabled timing system TS system components such as the timing system TS 116 and/or the TRS 114. The Enable Wi-Fi field 170 can automatically initiate the sending of entries to such systems over the Wi-Fi network 152 or similar communication facility. After selecting the Enable Wi-Fi field 170, the user interface screen 155 can open a window in which the user can set the IP address for the timing system TS 116 or one or more TRS 114, as well as the Remote and Local Sockets for the communication. The user interface screen 155 includes a Turn off Wi-Fi field 172 to allow the user to discontinue the communications with other timing system TS system components.

The user interface screen 155 includes a field Clear Data 174 that enables the user to erase all of the entries in memory on the METS software. The user interface screen 155 can also include a display area 176 for displaying METS user information, such as shown as the total entries and the current system time. As discussed also herein, display 176 can also be used to display retrieved photos or images that are associated with particular entered bib numbers. Finally, the user interface screen 155 includes an Exit field 178 to exist the METS application.

In some embodiments, one or more user interface keys or user entry means can be activated by a user of the METS 150 for obtaining at the activation of the user an RFID tag read 182, a bar code scan 184 and/or a manual entry of a participant identifier using keyboard 186.

ITS NET

Figure 4:
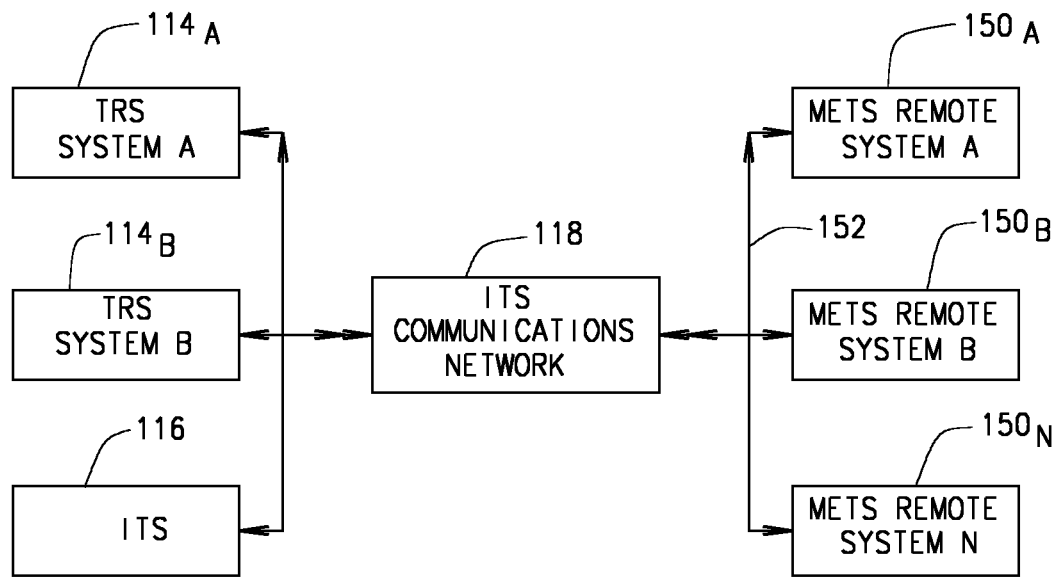
FIG. 4 is a high level architecture of an Integrated Timing System (ITS) having a plurality of automated participant proximity detectors and a plurality of handheld METS entry systems according to one exemplary embodiment.

FIG. 4 is a high level architecture of an Integrated Timing System (ITS) 116 having a plurality of automated tag reading systems 114 (shown as 114A and 114B), a timing system 116 and a plurality of METS 150 (shown as 150A, 150B, and 150N) that are the remote entry systems. The system communicate over the ITS communication network 118 and the METS system communicate with the other ITS METS systems over the METS communications link 152. As illustrated, multiple METS systems 150 can be used on a communications network 152 or 118 to send manually entered participant information to any one of several ITS RFID Systems TRS 114 or to the ITS user console 116. Each ITS TRS 114 can be configured to interface with METS 150 and can be addressed individually through a configuration option in the METS 150 that allows the METS user to define the IP address for the TRS 114, as well as the socket number for message reception. As will be addressed, the socket number provides a unique address on a computing device and permits multiple Backup systems to simultaneously communicate with the same TRS 114 system. FIG. 4 illustrates that each ITS 116 component 116 or participant detector system TRS 114 can be paired with one or more METS systems 150. However, in some embodiments, the user can have a one to many relationship and there does not have to be a one to one pairing. Thus, the user could have two TRS 114 systems and ten METS 150 remote systems, with each TRS 114 system communicating some or all of the ten METS 150 remote systems.

ITS NET Cloud Architecture

Figure 5:
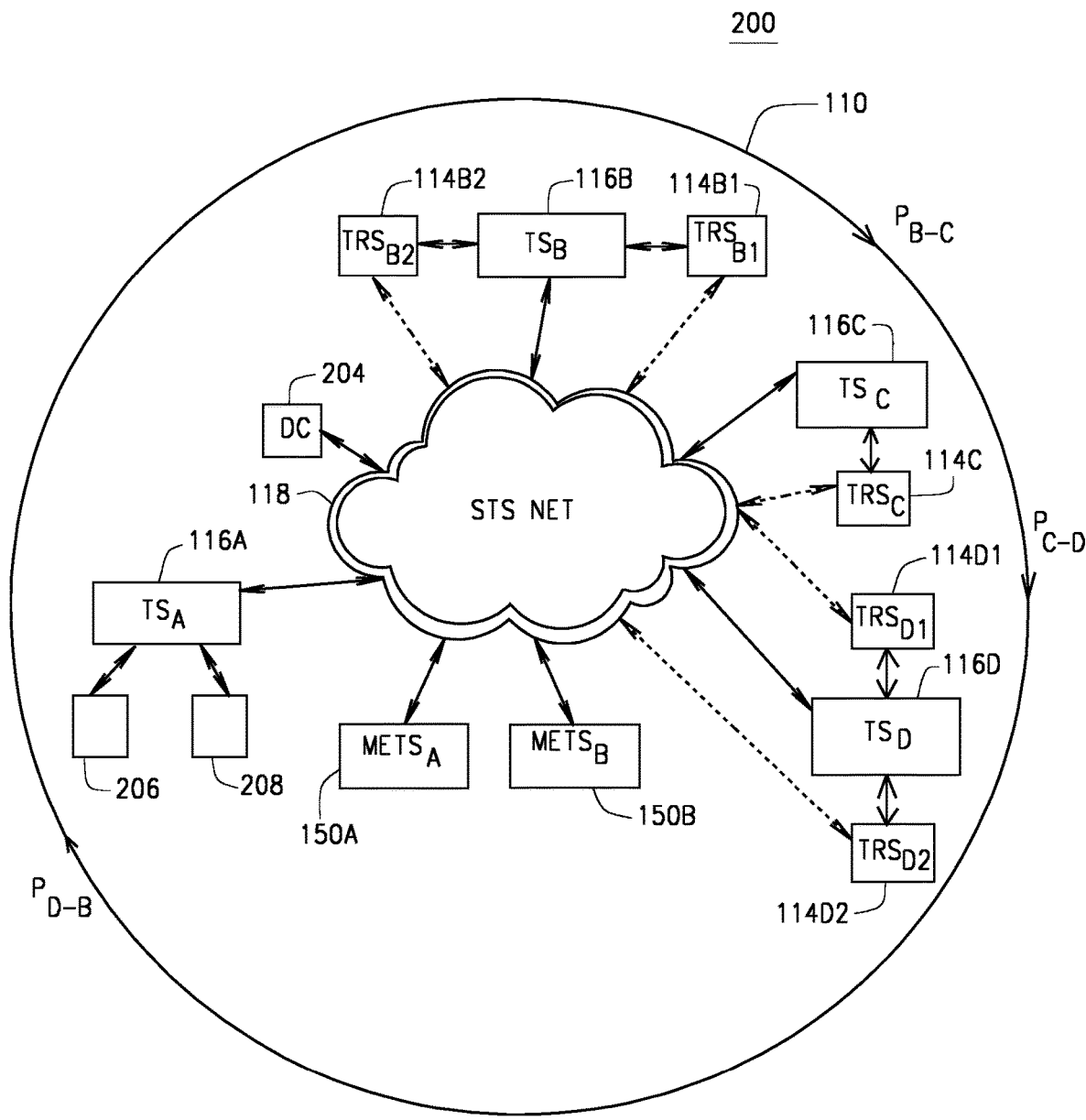
FIG. 5 is a schematic drawing showing the system architecture of the communication system suitable for use with one exemplary embodiment.

FIG. 5 is a schematic drawing showing the system architecture of the communication system suitable for use with one exemplary embodiment. As shown in FIG. 5, timing system $TS_A$ 116A is not paired with a detection system. Rather, timing system, $TS_A$ is equipped with a Graphical User Interface 206 and input system 208. Together, the Graphical User Interface 206 and input system 208 are configured to allow either manual entry by a human user or electronic entry from an outside system, and interacts with a database application for storing a plurality of participant data in the memory wherein each participant data including a participant identifier for uniquely identifying each participant, along with other participant data, without limitation, including contact information and group affiliation. Graphical User Interface 206 and input system 208 may be implemented in any suitable application programming environment, including but not limited to the Microsoft® .NET Framework.

The exemplary embodiment shown in FIG. 5 depicts two timing auxiliary systems, $STAS_A$-$STAS_B$ 210A, 210B. Timing auxiliary system, $TAS_A$ 210A is equipped with a display 212. The display 212 may include, but is not limited to a computer monitor, message board, time clock or any other display device. Timing auxiliary system, $TAS_A$ 210B is configured with suitable computer executable instructions for using the integrated communication interface timing system TS and TRS to communicate with other timing auxiliary systems, such as $TAS_B$, and one or more of the timing systems, $TS_A$-$TS_D$ over the communications network 118. In an exemplary embodiment, timing auxiliary system, $TAS_A$ may function as a remote controller, coordinating the communications between the other timing systems 214 and timing auxiliary systems.

In the exemplary embodiment depicted in FIG. 5, timing system $TS_A$ 116A may function as a participant check-in location, timing system $TS_B$ 116B may be positioned near the starting line of the race within two or more tag reader systems, $TRS_{B-1}$, and $TRS_{B-2}$. Timing system $TS_C$ 116C may be positioned at an intermediate point between the starting and finish lines and have two more of its own tag reader systems $TRS_{C-1}$ and $TRS_{C-2}$. Timing system $TS_D$ 116D has two or more tag reader systems $TRS_{D-1}$ and $TRS_{D-2}$ positioned near the finish line of the race.

One skilled in the art will recognize that the system may be configured to include more or fewer timing systems and more or fewer timing auxiliary systems as the configuration of the race course or quantity of participants would dictate. Additionally, the exemplary embodiment of FIG. 5 as shown depicts a circular racecourse over which one or more laps may be run. One skilled in the art will recognize that any course configuration may be supported by providing an appropriate quantity of timing systems, TS 116, TRS 114, and METS 150 arranged in a manner suitable to cover the entire course.

Figure 6:
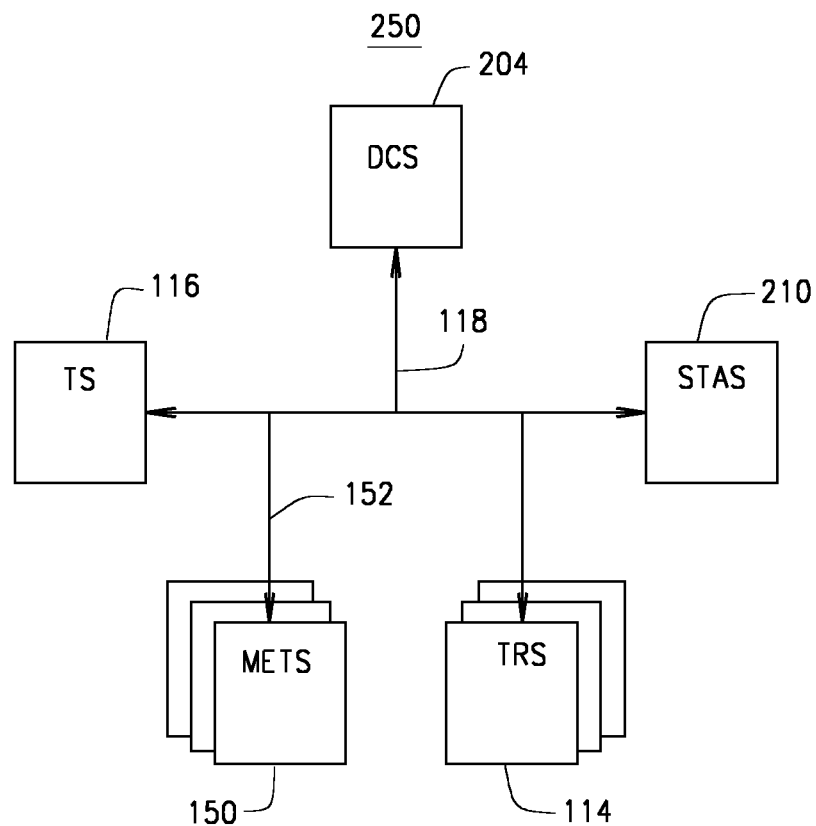
FIG. 6 is a schematic drawing showing the communication interfaces for an integrated timing system (ITS) and participant proximity detector system (TRS) configured for compatibility with a handheld METS system according to one exemplary embodiment.
Figure 7:
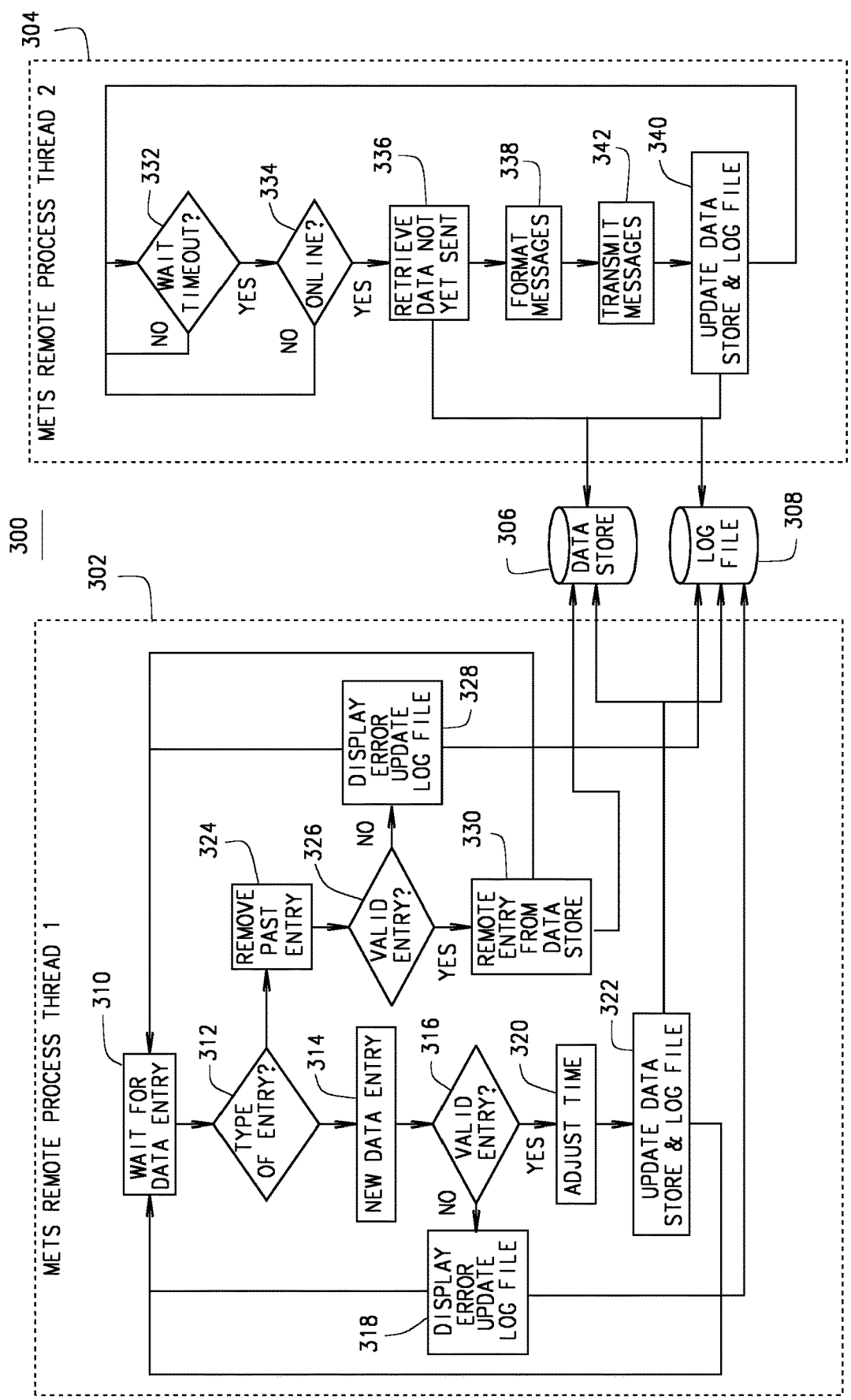
FIG. 7 is a flow chart illustrating two process threads of methods of a handheld METS system according to one exemplary embodiment.

During operation of the system, a participant P, wearing a participant identifier suitable for detection by each of the participant identifier detector systems TRS would begin near timing system $TS_B$, travelling along the path $P_{B-C}$. As the participant nears $TS_B$, the tag reader systems $TRS_{B-1}$ and $TRS_{B-2}$ will detect the participant's unique identifier or other participant data, record participant timing data, which constitutes part of the participant data, which includes the determined time of detection of the participant in proximity to a detection point at the location of $TRS_{B-1}$ and $TRS_{B-2}$ system. Timing system $STS_B$ may then use the integrated communication system to communicate the participant data to one or more of the timing systems, $STS_A$, $STS_C$-$STS_D$, or timing auxiliary systems, $STAS_A$-$STAS_B$ over the communications network STS NET. As the participant continues along the path $P_{C-D}$ through path $P_{D-B}$, timing system $TS_C$ receives tag reads from its tag readers $TRS_{C-1}$ and $TRS_{C-2}$ and $TS_D$ receives tag reads from its tag readers $TRS_{D-1}$ and $TRS_{D-2}$. In this way, the collective system is able to track the progress and timing of the event participant as they traverse the racecourse covering paths $P_{B-C}$, $P_{C-D}$ through path $P_{D-B}$.
ITS with METS FIG. 6 is schematic drawing showing the communication interfaces for an integrated timing system (ITS) and tag reader system (TRS) configured for compatibility with a METS system according to one exemplary embodiment. A typical METS ITS communications architecture 250 can include a Distributed Clock System DCS 204, one or more timing systems TS 116, one or more auxiliary timing systems STAS 210 and METS remotes 150 as well as the other ITS system components. The METS remotes 150 can include any type of computing platform without limitation.
METS Process Flows FIG. 7 is a flow chart 300 illustrating two process threads of methods of a METS system according to one exemplary embodiment. The following describes the individual functions. There are two action threads illustrated, a first thread 302 and a second thread 304. The two threads are related or coupled by their interactions with the data store 306 and the log file 308.

First thread 302 of the METS 150 starts at process 310 with the METS 150 waiting for a data entry from the user. Process 310 waits for the user to enter a tag serial number, participant's name, or any other key field that is being used to identify a participant in a sporting event. In process 312 the user enters user data and the process 312 determines the type of entry of such user entry. If process 312 determines that the new user data entry is new data, the process continues through process 314 to process 316 where the user data is analyzed as to whether the new data entered is a valid entry. Process 316 analyzes the entry and verifies that the information is either a valid serial number or a text field with at least one text character.

If process 316 determines that the new user entered data is not valid in process 316, a display error is generated on the METS user interface 154 by process 318. Process 318 also updates the log file 308 to indicate the error and thread 302 is returned to the wait for data entry in process 310. If the process 316 determines that the entry is valid data, the time is determined and adjusted in process 320 by the stored offset. Process 320 automatically deducts or adds time to the manually entered time entry or the time as determined by the METS clock to enable METS 150 to compensate for the participant's time in the event that the data entry was slightly ahead or behind the actual time that the participant crossed a monitored point. After adjusting the time in process 320, process 322 updates the data store 306 and the log file 308 with the data entry that include the entered bib number or name and the adjusted time from process 320. Process 322 stores the entry in a permanent data store 306 as well as a log file 308. The log file 308 and the data store 306 can be read by third-party programs and each file is comma delimited with the user data entry and time of entry. As such, the METS user interface 154 can provide for a screening to ensure that a user does not enter a comma into the data entry field.

Going back to process 312, if process 312 determines that the entry is not a new data entry, process 324 removes a past entry that is viewed as being a duplicate and then checks in process 326 whether the new duplicated entry is a valid entry. If it is not, then process 328 displays an error on the METS user interface 154 and updates the log file 308 to indicate the error. Thread 302 then return to process 310 to wait for data entry process 310.

The second thread 302 addresses the communication of the user data files with the ITS 116 and/or TRS 114 systems that are configured for receiving the manually entered tag entries and times of the METS system 150. Thread 302 starts at process 332, which is a wait timeout process. If the METS thread 302 determines in process 332 that the has time has run, then the process 332 continues to process 334 to determine if the METS 150 is on line and communicating over the METS interface with the intended ITS 116 or TRS 114 METS enabled systems. If the time has not run, process 332 returns to the start. If the METS 150 is not on line, the process 334 returns thread 304 to the start. If process 334 determines that the METS 150 is online, thread 334 continues to process 336 wherein it is determined whether the retrieved or user input data has been sent or is still waiting to be sent. If the user data has not been sent, process 338 formats the user data into the appropriate message format for transmission in process 338. In process 338 the entry information is formatted into a message using one of the two standard READ messages. The choice of which message is created is based on the original entry itself. If a serial number was entered, the READ message using the tag serial number is utilized. If a name or any other text entry was made, the second READ message is created with the participant name or other key text information. Process 342 transmits the formatted message from process 338 over the communication interface of the METS system 150. Process 342 can provide that the message is added to a network buffer that contains all entries that are being queued up for transmission to a system or device over the communications network 152.

After the transmission occurs in process 342, thread 304 continues to update the data store 306 and the log file 308 with the transmitted message details. After this, thread 304 returns to the wait timeout process 332. Referring back to process 336, if process 336 determines that the message or user data has already been transmitted, the process is noted and updated by process 340 to include updating the data store 306 and the log file 308 and process 340 returns thread 304 back to the wait timeout process 332.

This method provides that the user's data entries can be stored in a buffer and have a unique time stamp assigned to them that is 10 seconds beyond the time of original entry. This 10-second window provides enough time for the user to cancel the entry in case of a data entry error. Once the timeout occurs in process 332 on an individual entry in the buffer, it is sent to the next function where it is formatted and prepared for transmission over the communications network 152. Process 338 illustrates that the READ message is only formatted and transmitted after timeout has occurred. The timeout is suggested to be 10 seconds from the time stamp of the manual entry (assumes this the actual time stamp and not the adjusted time stamp). Process 332 indicates that up and until the timeout occurs, the METS system 150 in thread 304 resorts back to wait for data entry. There can be a message or report or otherwise to prompt the user to re-enter after the verification. Until the timeout occurs, the current illustrated flow provides for a user override by a new entry in A.

The METS system 150 thus provides for various timing capabilities to ensure that an accurate timing record or entry is obtained. For instance, a 10-sec "time stamp" for user entry override option, here are my thoughts on the process as related to the timing:

i. the user enters a text or numeric tab serial number via the METS User Interface 154, ii. the METS system time stamps the entry based on the original time entered as determined by the internal clock of the METS, iii. the METS applies a time adjustment based on factors to determine an adjusted time entry associated with the user entry data to form an Event Entry (with the adjusted time).

iv. if the network is up and the METS is not operating in Off Line mode, the Event Entry is stored in the buffer that includes a buffer entry time stamp that is the original time entered plus 10 seconds, v. the Buffer releases the Event Entry to the communications module for formatting and transmitting after the passing of the buffer entry time stamp and if no user override is received via the UI.

FIG. 7 illustrates just one embodiment of METS system 150 processes that are within the scope of the present disclosure related to user entered timed events. This particular embodiment provides:

a. Where an authorization fails, the system can prompt the user that the tag number entered was not valid and to reenter. This can occur regardless of the mode the user interface module.

b. Generally the time can be adjusted regardless of mode.

c. The storing and log files can occur regardless of mode.

d. A timeout check can ensure that that the user does not override or change the entry and therefore cancel the entry before it is finalized as either a transmission to a METS system or a permanent stored file, as such, the network buffer entry may apply to the online mode and not to the off-line mode in some embodiments.

e. The formatting of the message can be either only upon creation of the need for a READ message to be transmitted at an output, or it could also occur in the off-line mode to be stored in an output file for subsequent output as a group file. There can be an indexing or tracking of the tag read files to identify those that have been previously sent versus those that have never been sent, and therefore still need to be sent.

ITS Message Protocol Structure

FIG. 8 is an illustration of the format for the variable length METS packet message messages according to one exemplary embodiment. As shown, FIG. 8 illustrates a variable length message information packet structure that is used to communicate event data. This packet may contain any type of information and the format of the packet includes the following: message type, source, custom field(s), and end of message indicator. Several message types are already defined, as documented below. However, the message type may contain any text that uniquely identifies a message. The system receiving the message will use the message type to determine the action required. The next field in the packet includes the source. The source is a name or unique identifier that indicates which system transmitted the message. This information is used by the receiving system to know where to send a response. The source field can include any text, but typically the IP address of a computer or device is used. The next fields within the packet are customer fields that may contain any type of information. The flexibility of the protocol makes it possible to send any type of information from one system to another. The final field that should be included in each information packet contains EOMI. This is the end of message indicator that is used by the receiving system to know when all information within a packet has been received. The packet also uses the character to delimit each field.

METS Protocol Flow

FIG. 9 is an illustration of the formats for an exemplary set of METS messages according to one exemplary embodiment. There is shown the pre-defined information messages provided within the protocol. The following describes each message:

(A) Read message (READ). This message can be sent from a system that has just read a participant tag. The message could be sent to any other device(s) and the message includes the tag serial number just read. It also includes the time of the tag read as well as an optional packet number. The READ message is the primary information packet used to communicate tag read data to all devices. The packet could be expanded to include additional fields as necessary.

(B) Read message (READ). This message can be sent from a system that has just read a participant tag. The message could be sent to any other device(s) and the message includes name of the participant that corresponds with the tag serial number just read. It also includes the time of the tag read as well as an optional packet number. The READ message is the primary information packet used to communicate tag read data to all devices. The packet could be expanded to include additional fields as necessary.

(C) Re-send message (RESEND). This message can be sent from a receiving device to a transmitting device to request another send of a particular packet. If packet numbers are being used for the purpose of verifying that all packets are received, the re-send message can be used to request another transmission of a packet that never arrived at the receiving device. The packet could be expanded to include additional fields as necessary.

(D) Time Sync (TSYNC). This message can be sent to all devices on the network to indicate the current time at the transmitting device. This message is used to synchronize the time on all devices, which is crucial for RFID systems that are used for timing sporting events.

(E) Look up (LOOKUP). This message allows a device to request race information from another device. The identifier may be any text. In most cases, the identifier will be a tag serial number, race bib number, participant name, or perhaps a unique identifier that refers to a particular type of information. For example, if a device needs to know the current duration of a race, the LOOKUP message could be sent to a time system that is tracking the total race time. The identifier field might contain the text entry "RACETIME" and this entry could be used to indicate that the race duration is desired. The packet number field is optional and if not used, the field could contain a single space.

(F) Command. This message could be sent to a device to request that a particular command be executed. The IDENTIFIER field may contain any text desired. This field could be used to send any tag reader or participant detection system command to a remote device. For example, if the current battery charge level on a remote system needed to determined, a Command message could be sent with the text BATTERYSTATS in the IDENTIFIER field. The remote system would need to have functions built in that can process the command.

(G) RSIG. The RSIG message is sent using METS-ITS to any system that is listening for RSIG command. This is typically used by ITS METS to make sure the connection over the network is good to METS-ITS and also to verify that METS-ITS is scanning and listening for METS entries.

(H) RQIMAGE. The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a METS system where a file is located.

(I) STIMAGE. The STIMAGE message is sent from a system responding to a request for an image, e.g., RQIMAGE. The IDENTIFIER field should contain the unique descriptor for the image that was requested and that may contain any text desired. Typically, this field will contain a unique number for a participant in an event. However, the IDENTIFIER could also contain a specific location on a given system where a file is located.

The STS-ICS facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

ITS Enablement of METS

An ITS system can have the option to allow for the receipt and inclusion of METS received participant identifications/reads. For example, an Allow −BIB#− Manual Entries instruction can be used to clear database times and also Import −Bib entries in an Output File. When using a METS with an ITS at an event or race, the user may need to use the METS to enter and manually track the Bib # entries for those participants whose participant identifier was not successfully read. However, if the user accidentally enters the wrong participant identifier number, the user may want to remove that entry. This option, when checked, allows the user to back out an entry in the database. The entry removed is based on which database mode the user is currently using and it only works with single database modes. For example, if the database mode is set to Finish only, and the user enter −BIB#− and press Enter, the time in the Finish and Elapsed column will be reset to 00:00:00. If the user has the database mode set to Split 1, the time in that column would be reset to 00:00:00. This feature does not work with multiple database modes such as Split 1 & 2 because would not know which time to clear. When the user enter the bib number, the user should type the − before and after the bib number. This prevents someone from accidentally typing in perhaps −95 and removing a time when the user meant to type in 95 to actually record a time. Notice that the − key is very close to the 9 key on most numeric keypads. Thus, if the user truly wanted to clear the time for bib 95, the user would type −95− and press the Enter key. This feature also allows the user to import files from other ITS systems that may have a −bib number in their data and have those times cleared in the database.

The ITS system can also include the ability to synchronize the clocks of the one or more METS systems with the other ITS system components such as the participant detector systems TRS. In this embodiment, a Send Automatic Time Sync instruction can be sent to the relevant ITS components every couple of minutes, such as described herein as a heartbeat. The subsequent TSYNC message as described herein can be automatically sent out from the primary time clock to the other ITS system components including the METS and participant detector systems TRS as described above.

ITS METS Output File

The ITS system can be configured when equipped for METS to allow the user to define the output file that will be used to store METS received participant identifier reads coming from the METS reader. The METS Output File can be a standard text file that contains some basic information including the number of the antenna that last read the participant identifier, the participant identifier number, and the time of the read. This output file can be read by Microsoft Excel, any text editor, and virtually any database. The file is really used as a backup in case of a system failure. The output file can be used to reconstruct a database. For example, if the user has the own SQL database engine and the user wish to record the participant identifier reads in that database, the user will want to use this text file. In addition, if the user is using a third-party race scoring system such as Race Director or Runscore, this file will be helpful to the user since both programs can read it directly. Most users can simply use the built-in database within the ITS. It will automatically manage the complexities of race timing and save the user a lot of effort.

ITS Initiated METS Input Offset

The ITS METS system offers a manual level of timing redundancy to maximize the chances of reading participant identifiers successfully. The METS remotes are usually portable and located at a position spaced apart from the TRS monitored point such as the finish line.

The user can accomplish this by having two ITS at any monitored point. For example, if the user wants to maximize the read success at a finish line, the user might have a second system placed 20 feet behind the finish line. By having a second set of antennas and a second reader, the user receives two benefits. First, the user has a second system looking for participant identifiers, which improves the chances of reading a participant identifier at the finish line. Second, in the event that a single system failed for any reason, the user has a second system capturing participant identifier times. If the user elect to use two ITS at a single monitored point, the user can use the Reader Offset to compensate for the time differences between the locations of the two systems.

When a runner crosses the finish line, if their time is recorded as 10:15:00, they finished the race at 10:15 in the morning. When the runner crosses the second monitored point that is 20 feet behind the finish line, the system reads their participant identifier at 10:15:01. Most runners will take from 1 to 2 seconds to traverse the additional 20 feet. However, it is preferred that record a time, at the second system, that is closer to the time recorded at the finish line. Thus, the ITS system could set the offset time value to −1 seconds, and the ITS system will subtract 1 second from the participant identifier time being recorded at the backup system. Thus, the time stored in the database will be 10:15:00, instead of 10:15:01. This makes the finish time much more accurate. The ITS system will typically read most participant identifiers quite well. However, if during a 5K race, the finish line system missed five runners, the database time for the finish line is highly accurate for all but 5 runners. The user can now import the database from the backup system and only the five missing times are actually needed to fill in the missing times for the finish line system. Thus, five times captured at the backup system are used, and because of the offset value, they are reasonably accurate.

The ITS system is less likely to miss reading a participant identifier at both the finish line and backup line when redundant systems are used. This is particularly true when the runners have the participant identifiers properly worn on their race bibs. In other words, when two systems are operating in parallel at the finish line, the users are very likely going to achieve good read rates. Even if the user finds that a participant identifier was unable to be read, the Bib # Entry box allows the user to capture that time. If the user wishes to place a redundant system in front of the finish line, the user can instruct the ITS remote to add from 1 to 5 seconds to the time being captured. For example, if the redundant system is 25 feet in front of the finish line, the user could set the offset to 2 seconds, which will automatically add 2 seconds to the time recorded at that system, thus the time is more accurate of their actual finish time.

TRS Initiated METS Input Offset

In some embodiments, the ITS system participant proximity detector TRS can be an RFID reader configured to provide an updated determined or calculated METS Input Offset that can be sent to the METS or the ITS system for use is providing an improved offset to the manually input METS entries. The TRS can be configured to calculate the offset that should be used by the METS systems through transmission of the TROFFSET message to the METS or the ITS system. The TRS or ITS system can determine the dynamic value of the METS reader offset based on a number of factors that can be changed as the performance of the system or the performance of the participants change. For instance, the ITS or participant detector system TRS 114 can determine the METS offset based on the speed of the participants before and after the passing of the primary monitored point or between the primary monitored point and the secondary monitored point, or thereafter. The ITS or participant detector system TRS can determine the METS offset based on the distance between the location of the METS and either the primary or the secondary monitored point. This can be based on local distance calculations or on an input GPS feeds from each. Of course, this calculation and determination can also be made by the METS itself if so equipped. Other factors can also be used as known to those of skill in the art. The amount of the time offset in the TROFFSET message is likely to change during a single event as the first set of participants are likely to have a faster speed at the finish, more or less change in velocity and a different deceleration than participants that pass the monitored point later in the race. As such, the value of the TROFFSET can be calculated dynamically based on the TRS tag reads, determination of the velocity, acceleration or deceleration of the participants, and within a particular number of such within a particular period of time. Such dynamic determination of the TROFFSET time value can significantly improve the accuracy of the METS manual entry to more accurately reflect the time of passing of the participant at the monitored location.

This value can also be updated or based on a comparison of a manually entered METS time entry for a tag that was actually read by the participant detector system TRS as another example.

Output File Merge Report

This report is a very powerful and sophisticated tool that is rarely used for most races. However, its purpose is to provide extreme levels of redundancy for participant identifier timing at events in which the user want to maximize the participant identifier reads at a finish line.

A single ITS at a typical finish line for most events should read well as long as the participant identifier is being worn properly and is actually on the participant. When a second ITS system is used at a finish line, the combination of the two systems greatly enhances the chances of reading the timing participant identifiers.

Nonetheless, it is still possible that a missed participant identifier read could occur. This can happen because the participant identifier may have been accidentally damaged by the runner, or perhaps the participant identifier was accidentally removed from the bib or other surface where it was placed. If the user has timed enough races, the user knows that strange things happen that are often out of the control. Nonetheless, the user may need to time a race in which it is critical that the user maximize the read success. Thus, the user has an option that will improve the read success.

To guarantee maximum redundancy and success at this unique race, the user will also have an operator at the back of the finish chute that is using our Remote Entry Software (METS) 150 to simply enter bib numbers for every person that has finished the race. This extra operator is simply making sure that every participant's race number has been keyed into the system. If any runner has lost their bib number, the operator can simply key in their name as well. The result is that the user has an output file being created by this backup operator that contains a list of bib numbers.

The Output File Merge Report scans the output file created by at the finish line, looking for entries that contain a 0 for the bib number. In other words, it finds every entry that the operator made at the finish line when they could not see a bib number and simply pressed the Enter key. When they pressed the Enter key without a bib number, a 0 was written to the output file along with the time. Thus, has a finish time, but now needs to figure out who belongs with that finish time.

It now scans the Output File that came from the computer running the METS software. The user will actually copy this file from the computer onto the hard disk of the ITS at the finish line. The report now matches up the race finishers based on numbers and times and reconciles the two output files. The result of this complex but quick process is that the user will have a new output file. This file contains the combined results for the race with all the bib numbers of all of the participant contained in it. The user can then load this output file into the ITS as the finish times for everyone in the race. The user could also load this file into a spreadsheet or any other program.

FIG. 11 is a diagram of a highly portable METS and the interfacing with remote systems according to one exemplary embodiment. This embodiment illustrates the components of the handheld device including the location detection via the GPS position device, the image capture, the bar code scanner, and a user interface that can include a keyboard. The METSHH system communicates with the TS, ITS or TRS via any suitable means.

ITS Database File

The ITS system 116 can include a high-speed binary database that runs in memory and is updated very rapidly when participant identifiers are being read. When this database is saved to the disk drive, it is written to a text file using a comma-delimited format. This allows the file to be read by third-party programs without having to build a complex database interface. For example, Microsoft Excel or Notepad can directly read the file.

The following is a sample database file record: 1,Jay Cooper,08:00:00,08:15:00,00:00:00,00:00:00,00:00:00,08:45:00,00:45:00,50,Half Marathon,M,Allentown,Team Cooper,50001,Club Member,#76435,137.

The ITS system 116 can have the capability to automatically write out the database during a race to a file name selected by the user.

The following is one exemplary format for the database file: Bib#,Name,StartTime,Split1,Split2,Split3,Split4,FinishTime,ElapsedTime,Age,Division,Gender, City,TeamName,Participant identifierField,UserField1,UserField2, UniqueID.

The Bib # field will contain a value from 1 to 99999 depending on the version of the ITS system in use.

The Name will contain the full name and is typically formatted as FIRST NAME LAST NAME with no comma between the first and last name. The user should not include a delimiter of the ITS system in this field. If the ITS system uses a comma for example, the user should not include a comma in the name field, of course other delimiters are also possible. When the ITS system loads the database file, it uses the comma to determine the individual fields. Thus, if the user place a comma in the Name field, the user will cause ITS to use the wrong fields for the remaining entries on the line being read.

The following fields all contain a time based on the time of day: Start Time, Split1, Split2, Split3, Split4, Finish Time. All of these fields are in the format HH:MM:SS and there are no quote marks.

The Age field will contain up to three digits typically ranging from one to 100. The Division field will contain a text entry that can be up to 250 characters in length, although it is typically 20 or less characters long. The Gender field will contain a text entry that can be up to 250 characters in length, although it is typically one character with either an M or F entry. The City field will contain a text entry that can be up to 250 characters in length, although it is typically 25 or less characters long.

The Team Name field will contain a text entry that can be up to 250 characters in length, although it is typically 25 or less characters long.

The Participant identifier field is reserved for a future update. It will contain a text entry that can be up to 250 characters in length, although it is expected to be six or less characters long.

The UserField1 field will contain a text entry that can be up to 250 characters in length, although it is typically 25 or less characters long. This field may be used by the software to contain values related to team order for relay races. In some embodiments, the user will place information in this field related to the user's personal information such as emergency contact number.

The UserField2 field will contain a text entry that can be up to 250 characters in length, although it is typically 25 or less characters long. This is a second field that often contains additional personal information about a race participant.

The UniqueID field will contain a text entry that can be up to 250 characters in length, although it is typically 10 or less characters long. This field is often used to track race-day numbers or other unique values that identify a race participant. ITS can automatically insert a unique value in this field during the rapid registration process in the software.

Not only will ITS write this text file to the disk drive, it will read it back in. Thus, the user could create a database file using this format and the ITS system may read it just fine. It is important to make sure that any time fields the user creates are in the HH:MM:SS format with leading zeros on any times that are less than 10. For example, if the time is 9:10 am, the field should contain the entry 09:10:00. In most embodiments, if the user are creating a new file that will be loaded into ITS, the time fields should contain 00:00:00. However, if the user has a race with assigned start times, the user could load them into ITS as well by using the StartTime field.

ITS NET Protocol Messages

Generally, as described herein, an ITS 116 compatible component or system can have a state-less UDP network interface that is used for outbound and inbound messages. These messages include outbound packets from ITS 116 for READ information, as well as other data. In addition, the ITS component can listen for messages from other ITS 116 systems or third-party programs. This interface allows third-party programs to be developed which can work within the ITS architecture.

Network and Web Settings

In order for ITS NET compatible component/system to communicate messages from any ITS system or component, the ITS NET compatible component/system should have the network values set in the communication program software. The ITS NET compatible component/system has a powerful networking protocol that allows the user to interface to third-party applications, programs the user may have written, and to a number of add-on software programs that provide enhanced functionality. The networking options allow the user to define specific locations and networking interfaces that will be used to provide real-time race information including participant identifiers read as well as race participant information. These settings should not be changed unless the user has a complete understanding of how interfaces with third-party programs.

ITS NET Compatible Component/System Sockets

As ITS NET compatible component/system is processing messages coming from another ITS NET compatible system, it may determine that an error has occurred in the message that was received. If this is the case, it will request that ITS send the message again. To do that, it needs to know the Socket Value that the ITS system is listening on for inbound messages. In the Defaults screen of ITS, there is a value set in the Listen Socket box. That value should be typed in the Sender Socket box on this ITS NET compatible component/system configuration screen.

When the ITS system is communicating with other systems, it sends that information to an address on the other computers. That address is called a Socket in the networking world. The software running on another computer advertises that it is listening for messages on a given Socket. It is much like the telephone system. The user has a phone number that other people can call. In essence, the phone number is much like a socket in the ITS system. If someone sends information to the socket, the user will receive it. Thus, for the ITS system to send information to a one or more ITS NET compatible component/system, the ITS system component tasked with such communication needs to know what socket that ITS NET system is listening on. Thus, the Remote socket is like the phone number for each ITS NET system.

For example, the Remote Socket for a METS system can be 6000. In other words, the METS system will be listening on this number for any messages sent from an ITS system component. All METS systems can listen on the same Socket and thus they can all receive the same message. In other words, the ITS user instructs any ITS system that wants to transmit a message to a METS system to transmit it using the Socket 6000. Similarly, each METS system can also be programmed to transmit to one or more other ITS components based on their Socket address. For example, a primary participant detector systems TRS can have a Remote Socket address assigned such as Socket 6010, the secondary participant detector system TRS set for Socket 6020 or it can be assigned the same as the primary at Socket 6010. The ITS system can have a different Socket 6200, but can also be programmed to listen to Sockets 6010, 6020 and/or 6000, to monitor all traffic and communications.

However, it takes more than just a Socket value to reach an ITS system component such as a METS system. It also takes an IP address. For example, at the ITS system there can be an input for identifying the IP address for any of the ITS system components including the METS system. For the METS system, for example, the ITS system user can enter an IP address for the METS system as Remote Name/IP associated with the Remote Socket for the METS system. The user needs to enter into the ITS system the IP address where the user wants the message sent. Think of the IP address as a long area code in our telephone analogy. The ITS system needs to tell what part of the country the message should go to. In the networking world, an IP address looks like the following: 192.168.1.100. It is usually four different numbers with a period between them. These numbers define where in the world the user wish to send the message. In most embodiments, the user will be focused mostly on the last number, which can range from 1 to 255. This last value actually defines which computing platform that is attached to a local network the user wish to reach from among the plurality of computing platforms/computers. For example, if the MESTS user is using a laptop is connected to the ITS system via a Wi-Fi router, the user might be assigned number 120, and the full IP address might be 192.168.1.120. In an exemplary embodiment, if there are more than 255 computers on a network, the previous digit might be changed from a 1 to a 2. Thus, if one wanted to reach computer number 350 in a company, the user might need to use an IP address of 192.168.2.100 as that would be the location of the computer on the network. Notice the third value was changed from a 1 to a 2. As the user should know by now, these last two number ranges can support up to 255×255 total computers . . . about 65,000 total PCs.

In most embodiments, the ITS system related network will have less than 250 computers, so most of the present embodiments are concerned with the last digit in the IP address. If the ITS system user wants to only send messages to one ITS system component such as a METS, the user can place the IP address for that METS system computer in the Remote Name/IP field. However, the address for the PC could change every time it is powered up, if so set the last digit to 255 and the message will be sent to all PCs on the network. The value of 255 is special in networking and it means to send the message to everyone, thus anyone on the network of 192.168.1.XXX will receive the message. That works just fine because the ITS system is also using the Socket value to make sure that a receiving PC knows that the message is also for them. The Remote Socket and the Remote Name/IP work together to tell how to communicate with other systems.

The ITS system can be configured to include define each ITS and/or METS location by entering each particular IP address that contains the name the ITS component such as the METS system associated with the IP address. This can be used by the ITS system or other components thereof to provide additional information related to a received participant identifier read. For example, this can be used to identify that the participant identifier read was received from a particular METS system, versus another METS system or versus a TRS participant identifier detector at the primary or secondary points. For example, if the user is using at a split point on the course called Split 1, the user can send the participant identifier reads over the network to the primary system at the finish line and the user may wish to have them stored in the Split 1 column. Thus, the user could use the My Location entry to Split 1. If the user is using to send participant identifier reads to another ITS component, the user can place the word Finish in this column and it can be used by that system, such as for a display or otherwise This explanation also applies to the Listen for Messages Enabled box. The user will simply check the box and tell it can receive messages from other systems.

As addressed above, each ITS system can be programmed to listen to one or more Sockets on the communication network. The listen socket instructs the ITS system component such as the METS system to listen for messages on that socket value. These messages may include participant identifier reads or other types of data as will be discussed in more detail below.

The Listen Socket value is the network number that METS will use to listen for messages. In the networking world, there are unique addresses much like a street address for the home. In order for software programs to reach another program over the network, it needs to know the address of the destination. The number of addresses in a network can be quite large, but METS will restrict the number range to a value from 5,000 to 9,999. This would allow the user to have up to 5,000 METS systems running at the same time! In one embodiment, METS comes pre-set when the user purchases the ITS system to a value of 6000, but the user can change that at any time. In this exemplary embodiment the value 6002 is used since by design choice the ITS system defaults are set to this value at the factory to send information to any program listening on 6002. As known to those of skill in the art, the user could change these values to any number from 5,000 to 9,999. When the user enter the value, some embodiments should not include commas as the ITS system as a common can be used by the ITS system as a delimiter. Simply enter the value, such as 6000. The value the user use for the Listener Socket should match the value set in the ITS defaults for Remote Socket. For example, in one embodiment an ITS system can have a default value for Remote Socket set to 6000. The user would set the Listener Socket in METS to 6000.

As a quick summary of the Listen and Sender socket settings for METS:

1. The Listener Socket value in METS should match the Remote Socket value in the ITS Defaults screen.

2. The Sender Socket value in METS should match the Listen Socket value in the ITS Defaults screen.

Once the user has confirmed these settings, the user can next make sure the IP Address is set properly for the METS software.

ITS NET—METS IP Address

In the last couple of sections, the address for the network communications was discussed. Not only do software programs listen or send information using socket numbers, they need to know which computer is going to receive their messages. It turns out that a single computer could actually have two or more programs running at the same time, which are listening for messages on different sockets. The address mentioned earlier is actually specific to a software program, and not necessarily the computer where the software program is loaded. So, not only does the ITS system need to use a socket number (address for the software program), the ITS system also needs to use an IP address.

The IP Address value should be set to the IP address of the primary ITS at the finish line. The user can determine that address by using the System Info option in the Help Menu of ITS. METS needs to know this specific address so it can communicate over the network with the ITS. Recall that it was previously mentioned that if METS receives a message that is incorrect, it would request that ITS re-send that message. Thus, METS needs to know the IP address for the computer running the ITS software.

In the networking world, IP addresses are usually formatted to look something like 192.168.100.105. There are four numbers ranging in value from 1 to 255 and they are separated by periods. This number is the computer's unique network address in the world.

If the user wants to run the METS software on the same computer as ITS, the user could enter the phrase localhost in the IP Address box. This word, localhost, is a special way of telling the METS software that the ITS system is running on the same computer. The user can also set the IP Address in the ITS Defaults to localhost for this to work.

This concept of using localhost can be very helpful if the user is using a single computer for training or for doing a demonstration. However, the user should never run the ITS and METS software on the same computer for an actual race. It could result in decreased performance for ITS and cause the user to miss participant identifier reads.

Another advanced use of the IP address has to do with Broadcasts. In the networking world, the user can tell a software program to send out a message to all computers on the same network. To do this, the user simply set the last value in the IP address to 255. The value of 255 is reserved and designated to be used for messages that should be sent to everyone.

Here a network IP address is set to 192.168.100.255. The last value is set to 255, so messages will be sent to any computer on the 192.168.100 network. That means that computers that are designated as 0.1 to 0.254 will receive messages sent. For example, 192.168.100.50 would receive messages. 192.168.100.165 would also receive our messages. Because these two computers have ending addresses that are within the range of 1 to 254, they will receive our broadcast message that is being sent with an address of 255.

If a computer had an IP address of 192.168.120.40, the system would not receive the messages from the ITS system. The user sees, although the last value in the address is 40, the value just to the left of that is 120, which indicates the computer is on a different network. In summary, the first 3 values in the IP address identify the actual network location, and the $4^{th}$ value designates the computer that happens to be on that network. The user may want to set the IP address in METS to have a $4^{th}$ value of 255 when the user has written his own software to communicate with METS.

Exemplary METS Messaging Packet Structure

UDP packets are ideal for use with the METS-ITS network interface as they are quick and relatively easy to implement. However, there are well-known limitations for UDP packets, and the user should be completely familiar with these limitations before the user attempt to write software that interfaces with the ITS system.

The following includes the packet structure for an exemplary METS supported UDP packets. The METS and METS configured ITS components can be configured to listen and send on any socket ranging from 5000 to 9999. In addition, ITS can be set to send to a specific computer by using either the computer name or its IP address. Furthermore, ITS can send to all computers on the network by using 0.255 as the last bytes in the IP address. For example, if the user set ITS system to 192.168.1.255, it will send its messages as Broadcast packets. All ITS message are sent as clear text contained within the UDP packet, with fields separated by | characters. |EOM| should come at the end of each message.

ITS can have a state-less network interface such as provided by a user data protocol (UDP) system as used for outbound and inbound messaging over a suitable communication network. The METS-ITS system utilizes these messages to include outbound packets using METS-ITS for READ and ANNOUNCE information, as well as other data as described herein. In addition, an ITS using METS-ITS monitors the Internet connection for UDP METS messages from other METS configured ITS system components or third-party programs coupled to the same communication network. This interface allows third-party programs to be developed which can work within the ITS architecture.

UDP packets as used by the present METS system can provide a very quick and relatively easy system to implement and from which to build flexible and robust applications. While there are known limitations for UDP packets, the described application of the UDP packets in the METS system recognizes these limitations and adjusts the design and applications accordingly whereby UDP provides a very suitable solution for communicating between multiple ITS systems as well as sport timing auxiliary systems (STAS) in which auxiliary applications can provide vertical applications utilizing the information available within the METS system.

The following includes the packet structure for METS supported UDP message packets. The METS system including the METS reader and any METS configured ITS system component can be configured to listen and send on any socket ranging from 5000 to 9999. In addition, METS can be set to send to a specific computer by using either the computer name or its IP address. Furthermore, METS can send to all computers on the network by using 0.255 as the last bytes in the IP address. Of course in other systems and embodiments other broadcast messaging address can also be used and still be within the scope of the present invention. In this example, if the METS system is set to 192.168.1.255, the METS system sends messages as Broadcast packets. METS message can be sent as clear text contained within the UDP packet, with fields separated by the "|" characters. In many embodiments, the end of message indicator |EOM| should come at the end of each message.

As noted, the METS network interface can be configured for stateless broadcast communications systems, such as UDP using a broadcasting IP address indicator such as 255. The networking interface can however support a variety of different types of messages. These can include broadcast messages, multicast messages and unicast messages, between and among various METS enabled ITS systems and components.

In some embodiments, broadcast METS messages can be transmitted from a METS system interface over the stateless broadcast communication network with no addressing as to the intended recipient as well as no identification the METS configured ITS system component that is sending or sent the message. As such, each of the Broadcast METS messages can be read by any listening METS component, and once received by that METS component, the receiving METS ITS system component does not know which other METS ITS system sent the message.

In some embodiments, multicast METS messages can be transmitted from the METS interface over the stateless broadcast communication network with no addressing as to the intended recipient. However, these messages include an identification of the sending ITS system component including the METS system, e.g., FROM identifier. The METS multicast messages can be read by any METS configured ITS system component and once received by that ITS system component, the receiving ITS system component knows from which of the other communicating ITS systems the message originated. These include, by way of example, the READ, RESEND, TSYNC, and RSIG messages.

In some embodiments, Unicast METS messages can be transmitted from the METS interface over the stateless broadcast communication network with an identification of which the sending entity is (FROM identifier) as well as an identification of the intended receiving ITS system component (DEST or Destination identifier). These unicast METS-ITS messages are essentially point to point messaging within a stateless broadcast messaging communication system. Only the identified destination METS configured ITS system should receive these messages and they are ignored by all other listening ITS system. The receiving METS configured ITS system knows that the message was intended for its use and it knows the identification of the sending METS component. These include, by way of example, the RESEND, LOOKUP, COMMAND, RQIMAGE, and STIMAGE messages by way of example.

It should be understood to those skilled in the art that other broadcast, multicast and/or unicast messages can also be developed as an application may require or benefit from the present disclosure, and still be considered within the scope of the present disclosure.

Read Message (READ):

The READ packet is sent by METS-ITS to the network and can be captured by any device that is listening on the network for UDP packets. The packet is a real-time feed of any reads that are occurring at the particular ITS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested. Additionally a separate READ message can be used that includes the PARTICIPANTNAME field in lieu of the BIB#.

"METS" READ Message. In some embodiments of the above READ message can be used by METS to the manually entered tag serial number that was manually entered by the user of the METS remote. The time entry can be automatically generated by the METS remote, as described herein, or can also be a time that is manually entered. The METS READ message can contains the fields identified above, but will be described here for more detail as an example of the detail of one exemplary embodiment of METS.

Generally the multiple fields that can be any length. Each field is separated by the character, and the last field should contain the EOM| indicator. The following describes each field:

READ—This is the type indicator and it will contain the text READ.

FROM—This is the IP address or network name for the Backup system.

TAGSERIALNUMBER—This is the tag serial number that was manually entered into the Backup system.

TIME—This field contains the time when the manual entry was made.

PACKET #—The Backup system can include a sequential packet number, which allows the receiving system to know if any messages were lost during the communications process.

EOM—This is the last field of the READ message and it indicates the end of the message.

As a second exemplary embodiment of a METS READ Message, the METS can provide for the transmission of the system and participant's name that was manually entered, as well as the time for that entry whether manually entered, automatically time-stamped or adjusted by the offset for the METS that is applicable at that time. The message contains multiple fields that can be any length. Each field is separated by the character, and the last field should contain the EOM indicator. The READ, FROM, TIME, PACKET # and EOM are described as above, however, in this embodiment, the field PARTICIPANTNAME is the name that was manually entered into the Backup system. This field could also contain any other key identifier as long as the receiving system is aware of the identifier.

Resend Message (RESEND):

The RESEND message is sent to any ITS system requesting that it re-send a past message. If a message is lost over the network, a request to resend can be made for any of the last 999 messages sent previously. METS-ITS maintains a buffer with the past 999 messages. Once the 999 position is used, METS-ITS starts over at position 1. Thus, METS-ITS system is maintaining a circular buffer of messages.

Packet length=variable size
Total fields=5
RESEND|FROM|DEST|PACKET #|EOM|

The Destination field is the ITS system that should respond to this request. This is the same name set in the ITS system defaults for "My Name" in the networking section. If a request is made for a packet number that has not yet been used by METS-ITS, a packet response starting with the BLANK field can be received.

Time Sync Message (TSYNC):

The TSYNC message is sent using METS-ITS to any ITS system that is listening for Time Sync commands. This is typically used by ITS and METS to make sure the time on the METS laptop is the same as that on the ITS system. There can always be a slight delay in the network transmission, and as such a 0.25 to 0.5 second delay may be added to the time received using METS-ITS to compensate for the delay.

Packet length=variable size
Total fields=4
TSYNC|FROM|TIME|EOM|

The FROM field is the name set in the ITS Defaults as My Name.

As another exemplary detailed description, the METS TSYNC Message can be received at the METS system remote along with other ITS system components for the purposes of synchronizing the time with any other system on the network. This ensures that the METS system is using the same time, which is often required or beneficial for RFID timing systems used at sporting events.

The TSYNC message capability can provide any desired accuracy. In one embodiment, it can provide a level of accuracy around ¹⁄₁₀th of a second wherein the time stamp is to a one-second period for the tag reads. In other embodiments, the system can be configured to enable ¹⁄₁₀th or even ¹⁄₁₀₀th second time stamping on tag reads and in such embodiments, the TSYNC message enabled accuracy will become even more important. In some embodiments, when a system receives the TSYNC message, the local clock time on the receiving system is adjusted immediately. In other words, the PC clock on the destination computer is adjusted right away.

The TSYNC message can be used for distributing a standard time to each of the connected RFID Tag Reader Systems (TRS) systems, the METS systems or any other ITS system component that may need to record or stamp a time, message or event. In one embodiment, the TSYNC message is a simple pushed time such that all receiving devices, such as receiving participant detector systems TRS and METS reset their internal clocks to the time as received or specified in the TSYNC message. Additionally, ITS component system including the METS can be adapted to adjust its internal clock from the exact time specified in the TSYNC message to account for transmission system delays or variances, as may be known or predicted.

The ITS primary or supervising system, may be a ITS user console or another system including one of the participant detector systems TRS. The selection of the standard time within the ITS system configuration can be selected based on the expected accuracy of the computer clock for such device or can be based on its physical location within the network or course. The ITS software provides for an initialization of the synchronization of all or some of the coupled participant detector systems TRS and the METS remotes. This can be manually initiated by a user of such system or can be configured as a part of an automated routine or process.

In some embodiments, the TSYNC message can be retransmitted as an automated heartbeat message to provide for regular updating and to account for operational variances, as well as to provide reference times to provide updating where communication links may not continuously operate. As described herein, the Sync message can be transmitted to ITS components and the heartbeat message can support less expensive or complex systems that have clocks that less accurate and can drift one or more seconds over a 24 hour period. This can be important for applications wherein the total lapsed time is greater than a few hours.

Additionally, the receiving or transmitting system of the TSYNC message can be configured for compensation for communication system or transmission delays. This can be a predetermined or estimated compensation time, based on the system uses or network capabilities a value of 0.1 seconds to compensate for the network delay. This is based on using common Wi-Fi routers where the message delay across such a router using UDP datagrams is between 0.05 to 0.15 seconds. UDP datagrams are lower priority traffic, so some routers buffer them slightly.

Remote (METS) Signal Message (RSIG):

The RSIG message is sent using METS-ITS to any system that is listening for RSIG command. This is typically used by ITS METS to make sure the connection over the network is good to METS-ITS and also to verify that METS-ITS is scanning and listening for METS entries.

Packet length=variable size
Total fields=4
RSIG|FROM|TIME|EOM|

The FROM field is the name set in the ITS Defaults as My Name.

Time Remote (METS) Offset Message (TROFFSET):

The TROFFSET message is sent using METS-ITS interface and communications to a METS system from another ITS system component. This message can be used by METS as a input to adjust manually entered times at the METS system so that the manually entered time is offset or adjusted based on an externally provided estimate or predetermined amount of time as determined by the sending ITS system component.

Packet length=variable size
Total fields=4
TROFFSET|FROM|TIME|EOM|

In this message, the time is the offset set time or the amount of time for the METS system to adjust the manual entered big numbers from the METS terminal clock that is in synchronization due to the receiving of the TSYNC message. The FROM field is the name set of the ITS component originating the TROFFSET message. This can in some embodiments be the name set in the ITS Defaults as My Name.

Lookup Message (LOOKUP):

The LOOKUP message allows a device to request race information from another device. The identifier may be any text. In most cases, the identifier will be a tag serial number, race bib number, participant name, or perhaps a unique identifier that refers to a particular type of information. For example, if an ITS systems needs to know the current duration of a race, the LOOKUP message could be sent to an ITS system that is responsible for tracking the total race time. The identifier field might contain the text entry "RACETIME" and this entry could be used to indicate that the race duration is desired. The packet number field is optional and if not used, the field could contain a single space.

Packet length=variable size
Total fields=6
LOOKUP|FROM|DEST|IDENTIFIER|PACKET #|EOM|

Command Message (COMMAND):

The COMMAND message can be sent to an ITS system to request that a particular command be executed in that ITS system. The IDENTIFIER field may contain any text desired. This field could be used to send any tag reader or participant or tag detector command to a METS device. For example, if the current battery charge level on a METS system needed to determined, a Command message could be sent with the text BATTERYSTATS in the IDENTIFIER field. The METS system would need to have functions built in that can process the command.

Packet length=variable size
Total fields=6
COMMAND|FROM|DEST|IDENTIFIER|PACKET #|EOM|

Request Image Message (RQIMAGE): The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a METS system where a file is located. The COMPRESSION field may be used to specify the format of the image to be sent. If higher performance across a network is desired, this field might be used to indicate that High compression is desired. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKETSIZE|PSOCKET|PACKET #|EOM|

Image Sent Message (STIMAGE):

The STIMAGE message is sent from a system responding to a request for an image, e.g., RQIMAGE. The IDENTIFIER field should contain the unique descriptor for the image that was requested and that may contain any text desired. Typically, this field will contain a unique number for a participant in an event. However, the IDENTIFIER could also contain a specific location on a given system where a file is located. The COMPRESSION field indicates the type of compression used on the image when it was sent. If higher performance across a network is desired, this field might be used to indicate that High compression is desired. The PACKETSIZE field should contain a value indicating the length of the portion of the image just sent. Given that most images will contain more data than can be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.

Packet length=variable size
Total fields=9
STIMAGE|FROM|DEST|IDENTIFIER|COMPRESSION|PACKETSIZE|PSOCKET|PACKET #|EOM|

Request Image Library Contents Message (RQIDIR):

This message could be sent to a device to request that the names of all images available be provided for that system. The message is useful when interfacing with a system that contains photographs or other pictures such as logos or artwork. The IDENTIFIER field should contain a unique descriptor for the type of images desired or a filter mask for the names or locations of images. For example, the IDENTIFIER might contain the text entry *, or it might contain a qualifier such as *.JPG is the user only wants to receive a list of images that are in JPG format.

Packet length=variable size
Total fields=6
RQIDIR|FROM|DEST|IDENTIFIER|PACKET #|EOM|

Image Library Sent Message (STIDIR):

This message can be sent to one or more systems as a response to an RQIDIR message and it includes a list of images available. The FILELIST field will contain a list of images in text format that are available. Each image name will contain a carriage return line feed indicator at the end of the name. If the list has been completely transmitted, a final indicator at the end of the list will include an entry of EOL followed by a carriage return line feed. This indicator means there are no additional packets being sent and the entire list has been provided.

Packet length=variable size
Total fields=6
STIDIR|FROM|DEST|FILELIST|PACKET #|EOM|

Request Image Stream On Message (RQISTREAMON):

This message could be sent to a device to request that a particular image stream be enabled for a real-time video feed. The message is useful when interfacing with a system that contains a camera displaying live video. The IDENTIFIER field should contain a unique descriptor for the image stream desired and may contain any text desired. Typically, this field will contain a unique name for a camera or video interface. However, the IDENTIFIER could also contain a specific socket, URL, or other indicator that is a live video stream. The COMPRESSION field may be used to specify the format to be used when sending the video stream. If higher performance across a network is desired, this field might be used to indicate that High compression is desired. The field may contain any text that is recognized by the system designated as DEST. The PACKETSIZE field should contain a value indicating the maximum packet size to send at one time. Since the video stream will contain a great amount of information, the image stream can be deconstructed into small packets that are sent across the network. The PSOCKET field is used when it necessary or desired to have multiple packet streams being sent simultaneously from the DEST. For example, the field could contain 6000 on one packet and 6001 on a different packet to indicate that two streams are being used simultaneously. The TIMEOUT field can be used to indicate how long, in seconds, the stream should be kept alive. If this value is set to 0, the DEST will continue to send the stream until a RQISTREAMOFF message is received.

Packet length=variable size
Total fields=10
RQISTREAMON|FROM|DEST|IDENTIFIER|COMPRESSION|PACKETSIZE|PSOCKET|TIMEOUT|PACKET #|EOM|

Request Image Stream Off Message (RQISTREAMOFF):

This message could be sent to a device to request that a particular image stream be disabled. The IDENTIFIER field should contain a unique descriptor for the stream to be disabled. The PSOCKET field can also be used to identify a particular socket, in the event that multiple streams are being sent at the same time.

Packet length=variable size
Total fields=7
RQISTREAMOFF|FROM|DEST|IDENTIFIER|PSOCKET|PACKET #|EOM|

GPS Wakeup Message (GPSWAKE):

This message can be sent to a participant identifier or remote system to request that a communication session begin. This message will cause the participant identifier or remote system to send back parameters for the session in the buffer passed. The LSOCKET value can be used to identify a unique socket being used for the session. The SETTINGS value is used to request the participant identifier or remote system conform to specific parameters for the session. Once a session is established, the caller will wait for data to show up in the buffer and process it accordingly. Thus, this message is ideal for setting up a long-term session where data will trickle in over time, into the Buffer allocated.

Packet length=variable size
Total fields=7
GPSWAKE|FROM|DEST|SOCKET|SETTINGS-|BUFFER|EOM|

GPS Wakeup and Receive Message (GPSRWAKE):

This message can be sent to a participant identifier or remote system to request that a communication session begin with data being returned immediately. This message will cause the participant identifier or remote system to send back GPS location and/or time information in the buffer passed. The LSOCKET value can be used to identify a unique socket being used for the session. The SETTINGS value is used to request the participant identifier or remote system conform to specific parameters for the session. Once the initial data has been received the session will remain open and wait for additional data to appear in the buffer. This command differs from the GPSWAKE message since the GPSWAKE does not request data. It simply waits for data to show up. The GPSRWAKE message requests that all data be sent immediately, thus clearing the buffer on the participant identifier or remote system right away.

Packet length=variable size
Total fields=7
GPSRWAKE|FROM|DEST|SOCKET|SETTINGS-|BUFFER|EOM|

GPS Receive Message (GPSRMESS):

This message can be sent to a participant identifier or remote system to request that all data be transmitted immediately. This is a stateless message that does not require a session to first be created. Thus, it is ideal for rapid communications with a participant identifier or system. The LSOCKET value can be used to identify a unique socket being used to receive the data. The SETTINGS value is used to request the participant identifier or remote system conform to specific parameters for the data transmission. BUFFER will contain the actual data coming back to the caller.

Packet length=variable size
Total fields=7
GPSRMESS|FROM|DEST|SOCKET|SETTINGS-|BUFFER|EOM|

GPS Re-Send Message (GPSRSMESS):

This message can be sent to a participant identifier or remote system to request that the data previously sent, be re-transmitted again. This can be used to retrieve data that may have been lost in route to the caller. This is a stateless message that does not require a session to first be created. Thus, it is ideal for rapid communications with a participant identifier or system. The LSOCKET value can be used to identify a unique socket being used to receive the data. The SETTINGS value is used to request the participant identifier or remote system conform to specific parameters for the data transmission. BUFFER will contain the actual data coming back to the caller.

Packet length=variable size
Total fields=7
GPSRSMESS|FROM|DEST|SOCKET|SETTINGS-|BUFFER|EOM|

GPS Waypoint Message (GPSWAYP):

This message can be sent to a participant identifier or remote system to request specific data that is based on a specific or range of waypoint values. This is a stateless message that does not require a session to first be created. Thus, it is ideal for rapid communications with a participant identifier or system. The LSOCKET value can be used to identify a unique socket being used to receive the data. The SETTINGS value is used to request the participant identifier or remote system conform to specific parameters for the data transmission. BUFFER will contain the actual data coming back to the caller.

Packet length=variable size
Total fields=7
GPSWAYP|FROM|DEST|SOCKET|SETTINGS-|BUFFER|EOM|

GPS Send Message (GPSSENDS):

This message can be sent to a participant identifier or remote system to transmit data immediately. This message requires you to first create a session. The TSOCKET value can be used to identify a unique socket on the remote system. The SETTINGS value is used to request the participant identifier or remote system conform to specific parameters for the data reception. BUFFER will contain the actual data being sent. The advantage to using the GPSSENDS message is that the remote system will automatically handle error handling for lost messages that did not arrive.

Packet length=variable size
Total fields=7
GPSSENDS|FROM|DEST|LSOCKET|SETTINGS-|BUFFER|EOM|

GPS Send Message (GPSSENDC):

This message can be sent to a participant identifier or remote system to transmit data immediately. This message does not require a session. The TSOCKET value can be used to identify a unique socket on the remote system. The SETTINGS value is used to request the participant identifier or remote system conform to specific parameters for the data reception. BUFFER will contain the actual data being sent.

Packet length=variable size
Total fields=7
GPSSENDC|FROM|DEST|LSOCKET|SETTINGS-|BUFFER|EOM|

GPS Close Message (GPSCLOSE):

This message can be sent to a participant identifier or remote system to let it know that transmissions are now over and the sockets being used are released. The TSOCKET value can be used to identify a unique socket on the remote system. This message is used for sessions that are always open.

Packet length=variable size
Total fields=5
GPSCLOSE|FROM|DEST|LSOCKET|EOM|

In other embodiments, the formats of the above or other METS message packet can vary from that described above and herein and still be within the scope of the present disclosure.

ITS-IC Network Interface Design Guidelines

The following can provide additional insight about how to use the METS-ITS Networking Interface.

a) UDP packets are not guaranteed to be delivered on a network, as is the case with TCP. In some networks, routers cannot automatically send UDP packets unless they are configured to do so. For the METS-ITS communication system as described herein, the router should be able to send UDP packets, as well as a broadcast datagram.

b) In some embodiments of the METS-ITS communication system, the ITS system can only process inbound messages while it is connected to the timing system and the ITS system is Enabled and Scanning as addressed above. In such embodiments, if message packets are sent by METS to a METS configured ITS component, such sent message packets will be discarded unless such systems are in the Scanning mode.

c) In some embodiments, the METS and or METS configured ITS system can send and receive messages only if configured to do so in the software defaults. As such, the defaults should be set properly and enabling system/software may need to be rebooted after making any changes to ensure that the networking functions have started properly.

d) When METS is configured within an ITS system, METS sends a message packet, it can actually send the first packet, wait about 10 milliseconds, and send a second identical packet. Additionally as discussed this can be sent more than two times and the times between the duplicates message packets can vary based on the user and system requirements. This architecture can increase the odds that a packet can reach the destination IP address without having to add the overhead of an acknowledgement message function to the METS protocol. For example, in a METS configured ITS component r application, a filter can be created to identify and discard redundant packets. In other embodiments, the receipt, analysis and management of the redundant METS messages can be managed in other manners as may be desired by the user.

e) In some embodiments, the METS system can be designed to have minimal overhead and functionality. As such, in some embodiments, the METS system or METS configured ITS system component can be configured to ignore any errors. For example, the METS interface or functionality can be configured so that no error messages are sent or initiated if a METS message packet is transmitted or received in an improper format. In such embodiments, the malformed packet can simply be discarded.

f) While the ITS system is scanning for participant identifier reads and METS Read messages, it can check the ITS network packet buffer approximately every 1 to 3 seconds for new messages that have been received. The METS configured ITS components can utilize an automatic load balancing system for packet processing. If the ITS system determines that the participant identifier read and METS read low is lighter than normal, the ITS system can be configured to speed up the processing of inbound TRS participant identifier read and METS read messages. This improve the performance of the ITS system and increase the number of Read message from the participant detector systems TRS and the METS remote.

g) When the METS is configured as an ITS system component is transmitting messages to the other ITS METS entities, in some embodiments, such systems cannot process inbound messages until the sending or receiving of the METS messages is completed.

i) In some embodiments, the ITS system components and applications, including the METS system and the METS configured ITS components use one socket for outbound packets, and a different socket for inbound messages. Thus, any METS system application should use the sockets designated in the METS-ITS specification or as defined by the user as addressed later within in this specification.

METS-ITS Interfacing Application Example

The following is pseudo code for creating a METS-ITS UDP client application. This is simply an example of the type of METS-ITS communication code that can be implemented using the METS-ITS system and method as described herein.

```
int main( )
{
    int socketnum;
    struct socketnumaddress_in server_address;
    struct hostloc *host;
    char packet_data[128];
    host = (struct hostloc *) gethostbyname((char *)"192.168.1.255");
    server_address.sin_family = AF_INET;
    server_address.sin_port = htons(6002);
    server_address.sin_addr = *((struct in_addr *)host->h_addr);
    bzero(&(server_address.sin_zero),8);
    while (True)
    {
    printf("Type EXIT when done.");
    gets(packet_data);
    if ((strcmp(packet_data , "EXIT") == 0))
    {
    printf("Program done.");
    exit;
    }
    sendto(socketnum, packet_data, strlen(packet_data), 0,(struct socketnumaddress*)&server_addr,
        sizeof(struct socketnumaddress));
    }
}
```

ITS and ITS NET Component Exemplary Computer Operating Environment

Figure 15:
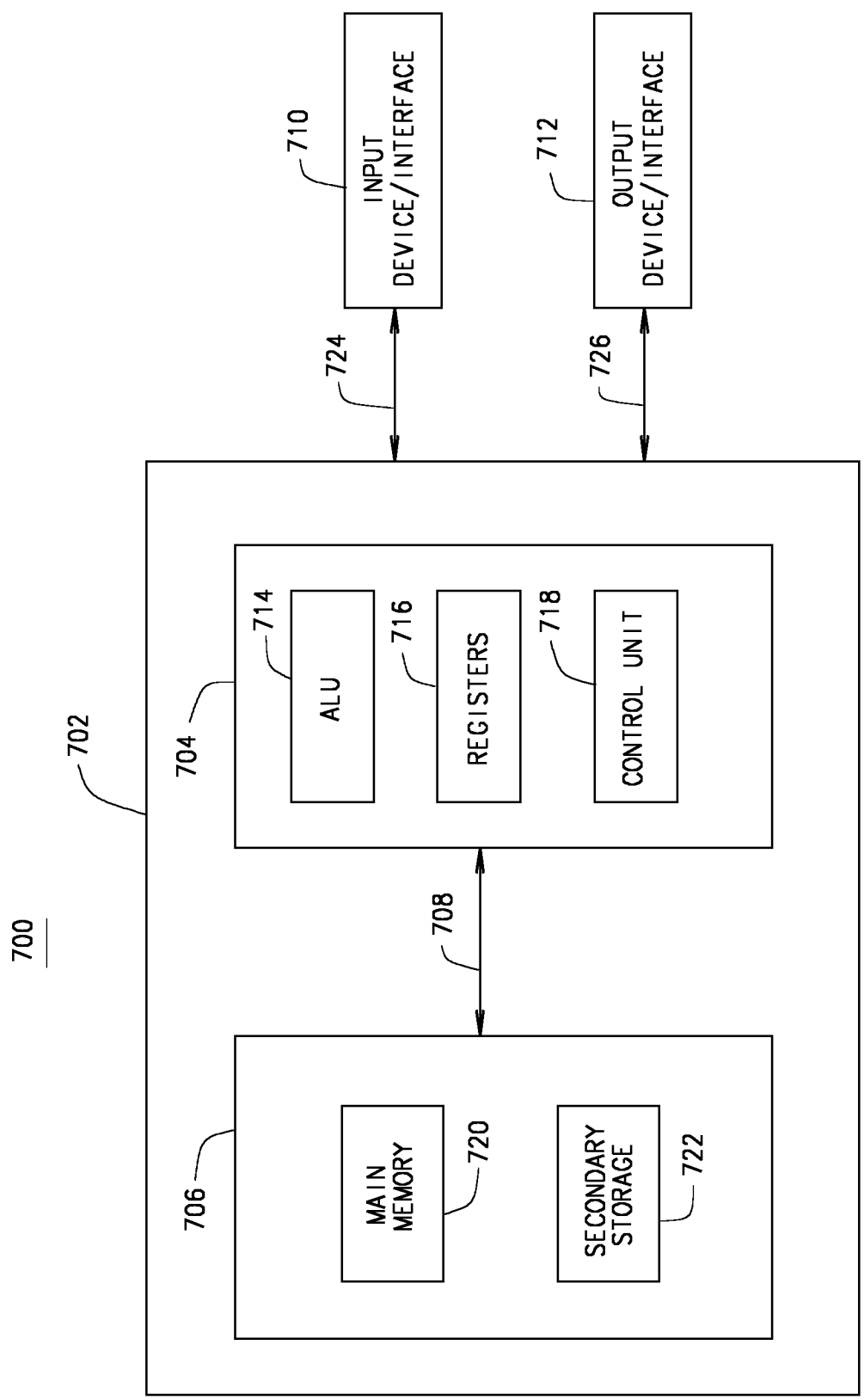
FIG. 15 is a block diagram of a specialized handheld METS entry computer system that is also suitable for implementing the object detection systems and timing systems in various embodiments as described herein.

Referring to FIG. 15, an operating environment for an illustrated embodiment of one or more tag readers, or participant/tag detection system and supporting timing systems as described herein is a computer system 700 with a computer 702 that comprises at least one high speed central processing unit (CPU) 704, in conjunction with a memory system 706 interconnected with at least one bus structure 708, an input device 710, and an output device 712. These elements are interconnected by at least one bus structure 708. As addressed above, the input and output devices can include a communication interface including an antenna interface. Any or all of the computer components of the ITS system 116 including the METS 150, ITS 116 and TRS 114 as well as communications systems 118 and methods can be any computing device including, but not limited to, a lap top, PDA, cell/mobile phone, as well as potentially a dedicated device. The software can be implemented as any "app" thereon and still be within the scope of this disclosure.

The illustrated CPU 704 for an METS-ITS, tag reader or detection system is of familiar design and includes an arithmetic logic unit (ALU) 714 for performing computations, a collection of registers for temporary storage of data and instructions, and a control unit 716 for controlling operation of the computer system 700. Any of a variety of processors, including at least those from Digital Equipment, Sun, MIPS, Motorola, NEC, Intel, Cyrix, AMD, HP, and Nexgen, is equally preferred but not limited thereto, for the CPU 704. This illustrated embodiment operates on an operating system designed to be portable to any of these processing platforms.

The memory system 706 generally includes high-speed main memory 720 in the form of a medium such as random access memory (RAM) and read only memory (ROM) semiconductor devices that are typical on a METS 150, IT or ITS 116, and/or detection system 114. However, the present disclosure is not limited thereto and can also include secondary storage 722 in the form of long-term storage mediums such as floppy disks, hard disks, tape, CD-ROM, flash memory, etc., and other devices that store data using electrical, magnetic, and optical or other recording media. The main memory 720 also can include, in some embodiments, a video display memory for displaying images through a display device (not shown). Those skilled in the art will recognize that the memory system 706 can comprise a variety of alternative components having a variety of storage capacities.

Where applicable, an input device 710, and output device 712 can also be provided in the METS-ITS, tag reader or detection system. The input device 710 can comprise any keyboard, mouse, physical transducer (e.g. a microphone), and can be interconnected to the computer 702 via an input interface 724, such as a graphical user interface, associated with or separate from the above described communication interface including the antenna interface for wireless communications. The output device 712 can include a display, a printer, a transducer (e.g. a speaker), etc., and be interconnected to the computer 702 via an output interface 726 that can include the above described communication interface including the antenna interface. Some devices, such as a network adapter or a modem, can be used as input and/or output devices.

As is familiar to those skilled in the art, the computer system 700 further includes an operating system and at least one application program. The operating system is the set of software that controls the computer system's operation and the allocation of resources. The application program is the set of software that performs a task desired by an ITS user, using computer resources made available through the operating system. Both are typically resident in the illustrated memory system 306 that may be resident on the METS-ITS, tag reader or detection system.

In accordance with the practices of persons skilled in the art of computer programming, the present disclosure is described below with reference to symbolic representations of operations that are performed by the computer system 700. Such operations are sometimes referred to as being computer-executed. It will be appreciated that the operations that are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 706.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A timing system for supporting a determination of a time of passing of a monitored detection point by a participant in an event having an RFID tag with a participant identifier associated with a unique participant identifier number, the system comprising:

a timing system server having a processor, computer executable instructions and an interface to interface with an RFID tag reader positioned proximate to the monitored detection point, to interface with a portable handheld device positioned at a spaced apart distance from the monitored detection point, and to interface with a participant/event reporting system, the timing system configured to:

receive over the interface one or more RFID tag reads of the RFID tag when the RFID tag is in proximity to the RFID tag reader, each received RFID tag read including the RFID participant identifier number and the RFID tag read times by the RFID tag reader;

receive over the interface a handheld device participant identifier number and a handheld device time, correlate the received RFID participant identifier number with the received handheld device participant identifier number to determine the participant identifier number;

compare the received RFID tag read times to the handheld device time;

calculate an adjusted time for the participant identifier number from the received handheld device time based on at least one of a geographic location of the RFID tag reader and a current geographic location of the handheld device; and transmit over the interface to the participant/event reporting system the participant identifier number and the calculated adjusted time as the time of passing of the participant having the participant identifier number.

2. The system of claim 1 wherein the timing system is further configured to determine a delta time from the difference in the current geographic location of the RFID tag reader and the received current geographic location of the handheld device wherein the adjusted time is calculated as a function of the determined delta time and to determine a velocity of the participant approaching the detection point from the received one or more tag reads from the RFID tag reader, and wherein the timing system further calculates the delta time based on the determined velocity.

3. The system of claim 1 wherein the timing system is communicatively coupled to a plurality of RFID tag readers and receives a plurality of tag reads for the plurality of the coupled RFID tag readers with two or more tag reads having different participant identifier numbers but one of which is the participant identifier number associated with the participant, the timing system configured to determine from the plurality of participant identifier tag read times for the plurality of participant identifier numbers, an average velocity of the plurality of participant identifiers approaching the detection point, and determines the delta time based on the determined average velocity.

4. The system of claim 1 wherein the timing system is configured to transmit over the interface a clock synchronization message including a system time value from the timing system and wherein the received RFID tag read times and the handheld times are each based on and relative to the system time value.

5. The system of claim 1 wherein the current geographic location of the at least one of the RFID tag reader and a monitored detection point are Global Positioning System (GPS) coordinates and wherein the received current geographic location of the handheld device is also GPS coordinates.

6. The system of claim 1 wherein the timing system is further configured to receive the current geographic location of the at least one of the RFID tag reader and a monitored detection point over the interface.

7. The system of claim 1 wherein the timing system is further configured to receive over the interface an image captured by the handheld device, to associate the received captured image with the handheld device time of the participant identifier number and to transmit the captured image over the interface along with the participant identifier number and the calculated adjusted time.

8. The system of claim 7 wherein the participant further has an associated bar code, and wherein the timing system is configured to receive over the interface a scanned bar code with the handheld time from the handheld device in lieu of the participant identifier number and the captured image and to determine the participant identifier number associated with the received bar code.

9. The system of claim 1 wherein the participant further has an associated bar code, and wherein the timing system is configured to receive over the interface a scanned bar code with the handheld time from the handheld device in lieu of the participant identifier number and to determine the participant identifier number associated with the received bar code.

10. The system of claim 1 wherein the received handheld device time for the participant identifier is a first handheld device time and the current geographic location of the handheld device is a first current geographic location, further comprising the timing system is configured
  to determine a delta time from the difference in the current geographic location of the RFID tag reader and the received current geographic location of the handheld device wherein the adjusted time is calculated as a function of the determined delta time;
  to receive over the interface a second handheld device time with the participant identifier number and a second current geographic location of the handheld device that is different from the first current geographic location;
  to associate the received second handheld device time with the second current geographic location of the handheld device;
  wherein the determining of the delta time includes a comparison of the first current geographic location of the handheld device to the second current geographic location of the handheld device and relative to the current geographic location of the RFID tag reader and wherein calculating the adjusted time for the participant identifier number is responsive to the comparing.

11. The system of claim 1 wherein determining that the received RFID tag read times are not usable as the time of passing of the monitored detection point by the participant includes a comparison of the RFID tag read times to the handheld time, and a comparison of the current location of the RFID tag reader relative to the current location of the handheld device.

12. The system of claim 1 wherein when the timing system fails to correlate the participant identifier number of the handheld device with the participant identifier number of the RFID tag reads, the timing system automatically determines the adjusted time based on the handheld time.

13. The system of claim 1 wherein the RFID tag reader is offset from the monitored detection point, and wherein the timing system is configured to determine an offset time as a function of the difference between the current geographic location of the RFID tag reader and a current geographic location of the monitored detection point, wherein the determining that the received RFID tag read times are not usable as the time of passing of the monitored detection point by the participant is a function of the determined offset time and a comparison of the RFID tag read times to the handheld time.

14. The system of claim 1 wherein the determining that the received RFID tag read times are not usable as the time of passing of the monitored detection point by the participant includes comparing the received RFID tag reads with RFID tag reads of a second participant in the same event and determining that received tag reads of the participant do not accurately indicate the time of passing of the participant at the detection point.

15. A method for a timing system using an RFID tag reader to determine a time of passing of a monitored detection point by a participant in an event having a participant identifier with an associated unique participant identifier number, the method comprises:
  in a timing system server having a processor, computer executable instructions, and an interface to interface with an RFID tag reader positioned proximate to the monitored detection point, to interface with a portable handheld device positioned at a spaced apart distance from the monitored detection point, and to interface with a participant/event reporting system, performing the method of:
  receiving a current geographic location of at least one of the RFID tag reader and the monitored detection point;
  receiving over the interface one or more RFID tag reads of the RFID tag when the RFID tag is in proximity to the RFID tag reader, each received RFID tag read including the RFID participant identifier number and the RFID tag read times by the RFID tag reader;
  receiving over the interface a handheld device participant identifier number, a handheld device time;
  correlating the received RFID participant identifier number with the received handheld device participant identifier number to determine the participant identifier number;
  comparing the received RFID tag read times to the handheld device time;
  calculating an adjusted time for the participant identifier number from the received and stored handheld device time based on at least one of the stored geographic location of the RFID tag reader and the received current geographic location of the handheld device; and
  transmitting over the interface to the participant/event reporting system the participant identifier number and the calculated adjusted time as the time of passing of the participant having the participant identifier number.

16. The method of claim 15 wherein the timing system performs the method of:
  determining a delta time from the difference in the stored current geographic location of the RFID tag reader and the received current geographic location of the handheld device wherein the adjusted time is calculated as a function of the determined delta time and determining a velocity of the participant approaching the detection point from the received one or more tag reads from the participant proximity detector, and wherein calculating the delta time is based on the determined velocity.

17. The method of claim 16 wherein the timing system performs the method of:
  receiving a plurality of tag reads for a plurality of participant identifier numbers each having a plurality of identified participant identifier read times, one of which is the participant identifier number associated with the participant; and determining from the plurality of participant identifier read times for the plurality of participant identifier numbers an average velocity of the plurality of participant identifiers approaching the detection point, and wherein the determining of the delta time is based on the determined average velocity.

18. The method of claim 15 wherein in the timing system performs the method of: receiving a second current geographic location of the handheld device that is different from the current geographic location.

19. The method of claim 15 wherein the timing system performs the method of:

receiving over the interface an image captured by the handheld device;

associating the received captured image in association with the handheld device time of the participant identifier number; and transmitting the captured image over the interface along with the participant identifier number and the calculated adjusted time.

20. The method of claim 19 wherein the participant further has an associated bar code, and wherein the timing system performs the method of:

receiving over the interface a scanned bar code with the handheld time from the handheld device in lieu of the participant identifier number and the captured image; and determining the participant identifier number associated with the received bar code.

\* \* \* \* \*